US012785249B2

(12) United States Patent
Yun et al.

(10) Patent No.: US 12,785,249 B2
(45) Date of Patent: Nov. 3, 2026

(54) ELECTRONIC DEVICE COMPRISING ANTENNA

(71) Applicant: Samsung Electronics Co., Ltd., Suwon-si (KR)

(72) Inventors: Himchan Yun, Suwon-si (KR); Sungkoo Park, Suwon-si (KR); Kyungjae Lee, Suwon-si (KR); Kookjoo Lee, Suwon-si (KR); Donguk Choi, Suwon-si (KR); Soonho Hwang, Suwon-si (KR); Seunghwan Kim, Suwon-si (KR); Jaebong Chun, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 17 days.

(21) Appl. No.: 19/091,092

(22) Filed: Mar. 26, 2025

(65) Prior Publication Data

US 2025/0226568 A1 Jul. 10, 2025

Related U.S. Application Data

(63) Continuation of application No. PCT/KR2023/014713, filed on Sep. 25, 2023.

(30) Foreign Application Priority Data

Sep. 26, 2022 (KR) ........................ 10-2022-0122005
Nov. 1, 2022 (KR) ........................ 10-2022-0144070

(51) Int. Cl.
*H01Q 1/22* (2006.01)
*G06F 1/16* (2006.01)

(52) U.S. Cl.
CPC ......... *H01Q 1/2266* (2013.01); *G06F 1/1652* (2013.01)

(58) Field of Classification Search
CPC ........ H01Q 1/2266; H01Q 1/243; H01Q 9/30; H01Q 13/10; H01Q 5/335; G06F 1/1652; H04M 1/0214; H04M 1/026
See application file for complete search history.

(56) References Cited

U.S. PATENT DOCUMENTS 10,075,569 B2 9/2018 Kim et al.
11,115,511 B1 * 9/2021 Ghaemi ............... H04B 7/0602
(Continued)

FOREIGN PATENT DOCUMENTS

EP 3 414 792 B1 9/2020
EP 3 952 019 A1 2/2022
(Continued)

OTHER PUBLICATIONS

International Search Report with English translation and Written Opinion dated Jan. 17, 2024; International Appln. No. PCT/KR2023/014713.

(Continued)

*Primary Examiner* — Dameon E Levi
*Assistant Examiner* — Jordan E. DeWitt
(74) *Attorney, Agent, or Firm* — Jefferson IP Law, LLP

(57) ABSTRACT

An electronic device is provided. The electronic device includes a first housing, a second housing, and a communication circuit. The communication circuit is configured to communicate with an external electronic device by using an electromagnetic field generated in a first slot of the first housing and a second slot of the second housing on the basis of powering a first conductive portion of the first housing in a folded state.

20 Claims, 15 Drawing Sheets

(56) References Cited

U.S. PATENT DOCUMENTS

| | | | | |
|---|---|---|---|---|
| 11,314,283 | B2 * | 4/2022 | Yeh | E05D 7/00 |
| 2015/0055287 | A1 * | 2/2015 | Seo | G06F 1/1652 361/679.27 |
| 2017/0346164 | A1 * | 11/2017 | Kim | H04M 1/0266 |
| 2018/0366813 | A1 * | 12/2018 | Kim | H01Q 9/04 |
| 2019/0369668 | A1 * | 12/2019 | Kim | G06F 1/1616 |
| 2020/0051468 | A1 * | 2/2020 | Jung | G06F 1/1616 |
| 2020/0245481 | A1 * | 7/2020 | Yoon | G06F 1/1616 |
| 2020/0319672 | A1 * | 10/2020 | Kim | G06F 1/1616 |
| 2021/0168227 | A1 | 6/2021 | Jung et al. | |
| 2021/0191460 | A1 * | 6/2021 | Lee | G06F 1/1641 |
| 2021/0318720 | A1 * | 10/2021 | Lin | G06F 1/1616 |
| 2022/0069444 | A1 | 3/2022 | Shi et al. | |
| 2022/0123469 | A1 | 4/2022 | Hsu et al. | |
| 2022/0155826 | A1 * | 5/2022 | An | G06F 1/1652 |
| 2022/0286542 | A1 * | 9/2022 | Seo | H01Q 1/243 |
| 2022/0384934 | A1 * | 12/2022 | Son | H01Q 1/243 |
| 2023/0259178 | A1 * | 8/2023 | An | G06F 1/1643 361/679.27 |
| 2023/0261365 | A1 | 8/2023 | Yoon et al. | |
| 2023/0275340 | A1 * | 8/2023 | Hwang | H01Q 1/243 |
| 2023/0299466 | A1 | 9/2023 | An et al. | |
| 2023/0395970 | A1 | 12/2023 | Kim et al. | |
| 2024/0079786 | A1 * | 3/2024 | Wang | H01Q 9/42 |
| 2024/0113431 | A1 | 4/2024 | Hsu et al. | |
| 2025/0030151 | A1 * | 1/2025 | Yun | H01Q 1/243 |
| 2025/0030165 | A1 * | 1/2025 | Kim | H01Q 5/378 |
| 2025/0216902 | A1 * | 7/2025 | Yun | G06F 1/1652 |
| 2025/0226568 | A1 * | 7/2025 | Yun | H01Q 1/2266 |
| 2026/0013091 | A1 * | 1/2026 | Ahn | H04M 1/0262 |
| 2026/0039733 | A1 * | 2/2026 | Han | G06F 3/03545 |
| 2026/0045680 | A1 * | 2/2026 | Nam | H01Q 1/243 |
| 2026/0122164 | A1 * | 4/2026 | Kim | H04M 1/0216 |

FOREIGN PATENT DOCUMENTS

| | | | |
|---|---|---|---|
| KR | 10-2020-0101253 | A | 8/2020 |
| KR | 10-2021-0102037 | A | 8/2021 |
| KR | 10-2022-0109910 | A | 8/2022 |
| KR | 10-2022-0118201 | A | 8/2022 |
| KR | 10-2569091 | B1 | 8/2023 |
| KR | 10-2580692 | B1 | 9/2023 |
| WO | 2020/119357 | A1 | 6/2020 |
| WO | 2020/259663 | A1 | 12/2020 |
| WO | 2021/107700 | A1 | 6/2021 |
| WO | 2021/162290 | A1 | 8/2021 |
| WO | 2022/119139 | A1 | 6/2022 |

OTHER PUBLICATIONS

Extended European Search Report dated Nov. 28, 2025; European Appln. No. 23873046.9-1201 / 4583307 PCT/KR2023014713.

* cited by examiner

ELECTRONIC DEVICE COMPRISING ANTENNA

CROSS-REFERENCE TO RELATED APPLICATION(S)

This application is a continuation application, claiming priority under 35 U.S.C. § 365(c), of an International application No. PCT/KR2023/014713, filed on Sep. 25, 2023, which is based on and claims the benefit of a Korean patent application number 10-2022-0122005, filed on Sep. 26, 2022, in the Korean Intellectual Property Office, and of a Korean patent application number 10-2022-0144070, filed on Nov. 1, 2022, in the Korean Intellectual Property Office, the disclosure of each of which is incorporated by reference herein in its entirety.

BACKGROUND

1. Field

The disclosure relates to an electronic device comprising an antenna.

2. Description of Related Art

An electronic device may transmit a signal through an antenna or receive a signal through the antenna. A housing of the electronic device may include a conductive portion formed of a conductive material in a portion of the housing. The conductive portion of the housing may operate as an antenna for transmitting and/or receiving wireless signals. A processor may provide a signal to the conductive portion through a signal transmission path, and may receive a signal from the conductive portion through the signal transmission path.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device comprising an antenna.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing, and communication circuitry. The first housing includes a first periphery, a second periphery, and a third periphery. The first periphery is perpendicular to a folding axis. The first periphery includes a first non-conductive portion. The second periphery is opposite to the first periphery. The third periphery is parallel to the folding axis. The third periphery includes a second non-conductive portion. The third periphery is disposed between the first periphery and the second periphery. The second housing includes a fourth periphery, a fifth periphery, and a sixth periphery. The fourth periphery is perpendicular to the folding axis. The fourth periphery includes a third non-conductive portion. The fifth periphery is opposite to the fourth periphery. The sixth periphery is parallel to the folding axis. The sixth periphery includes a fourth non-conductive portion. The sixth periphery is disposed between the fourth periphery and the fifth periphery. The first housing and the second housing are rotatably connected with respect the folding axis. In a folded state of the electronic device in which the third periphery and the sixth periphery face each other, the first periphery faces the fifth periphery. In the folded state, the second periphery faces the fourth periphery. The first housing includes a first conductive portion, a second conductive portion, and a first slot. The first conductive portion extends from the second non-conductive portion to the second non-conductive portion. The second conductive portion extends from the second non-conductive portion to a location on the second periphery. The first slot is between the second conductive portion and a first support member disposed within the first housing. The second housing includes a third conductive portion and a second slot. The third conductive portion extends from the fourth non-conductive portion to a location on the fifth periphery. The second slot is between the third conductive portion and the second support member disposed within the second housing. In the folded state, the communication circuitry is configured to communicate with an external electronic device using an electromagnetic field formed at the first slot and the second slot, based on feeding the first conductive portion.

In accordance with another aspect of the disclosure, an electronic device is provided. The electronic device includes a first housing, a second housing, and communication circuitry. The first housing includes a first periphery, a second periphery, and a third periphery. The first periphery extends from a folding axis. The first periphery includes a first non-conductive portion. The second periphery extends from the folding axis. The second periphery is opposite to the first periphery. The third periphery is spaced apart from the folding axis. The third periphery includes a second non-conductive portion. The third periphery is disposed between the first periphery and the second periphery. The second housing includes a fourth periphery, a fifth periphery, and a sixth periphery. The fourth periphery extends from the folding axis. The fourth periphery includes a third non-conductive portion. The fifth periphery extends from the folding axis. The fifth periphery is opposite to the fourth periphery. The sixth periphery is spaced apart from the folding axis. The sixth periphery includes a fourth non-conductive portion. The sixth periphery is disposed between the fourth periphery and the fifth periphery. The communication circuitry is disposed in at least one of the first housing or the second housing. The first housing and the second housing are rotatably connected with respect the folding axis. In a folded state of the electronic device, when the electronic device is viewed from above in a direction from the second housing toward the first housing, the fourth non-conductive portion is disposed to overlap the first conductive portion extending from the first non-conductive portion to the second non-conductive portion. In the folded state, when the electronic device is viewed from above in a direction from the second housing toward the first housing, the third non-conductive portion is disposed to overlap the second conductive portion extending from the second non-conductive portion to a location on the second periphery.

Other aspects, advantages, and salient features of the disclosure will become apparent to those skilled in the art from the following detailed description, which, taken in conjunction with the annexed drawings, discloses various embodiments of the disclosure

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
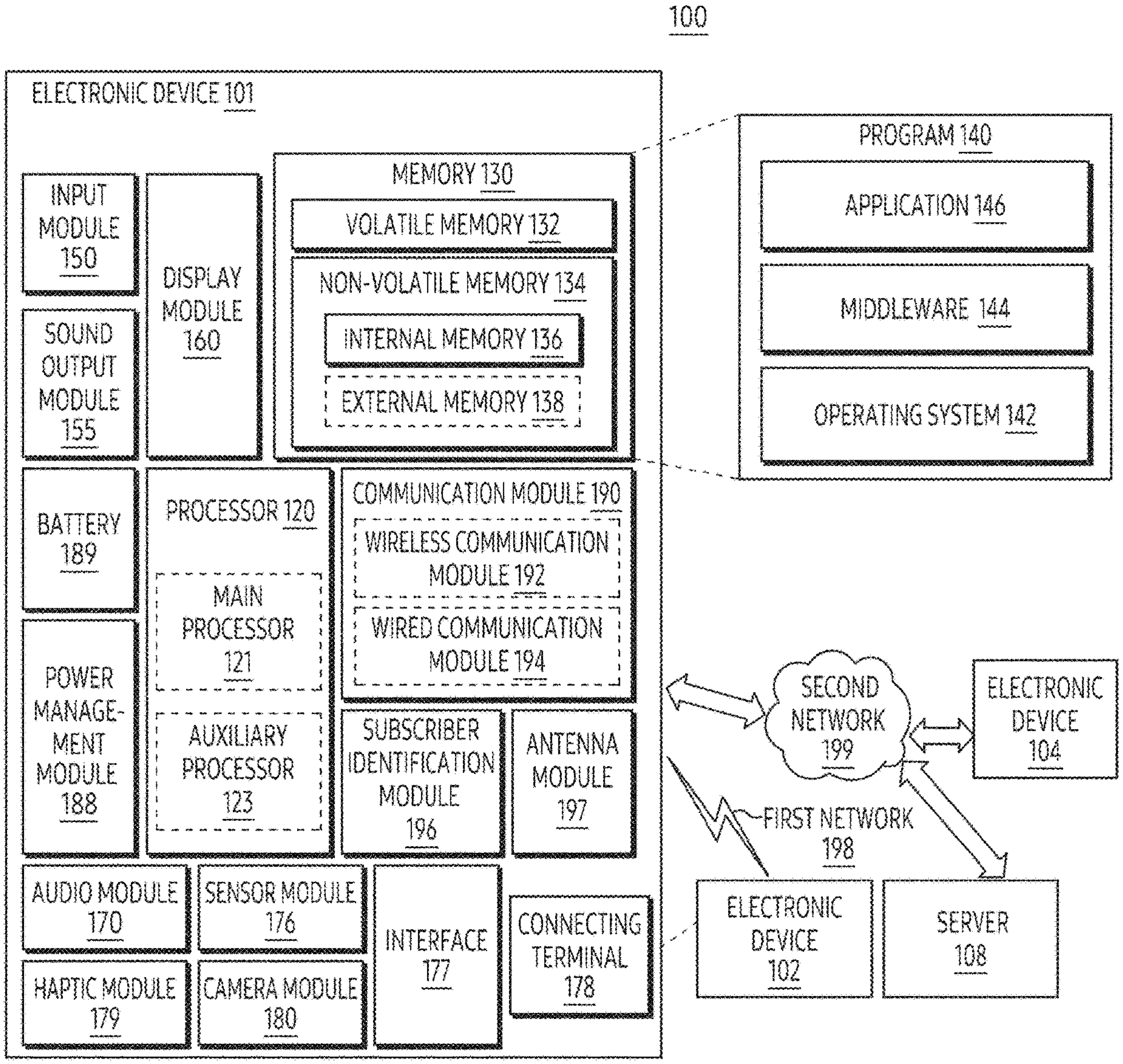
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter-wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
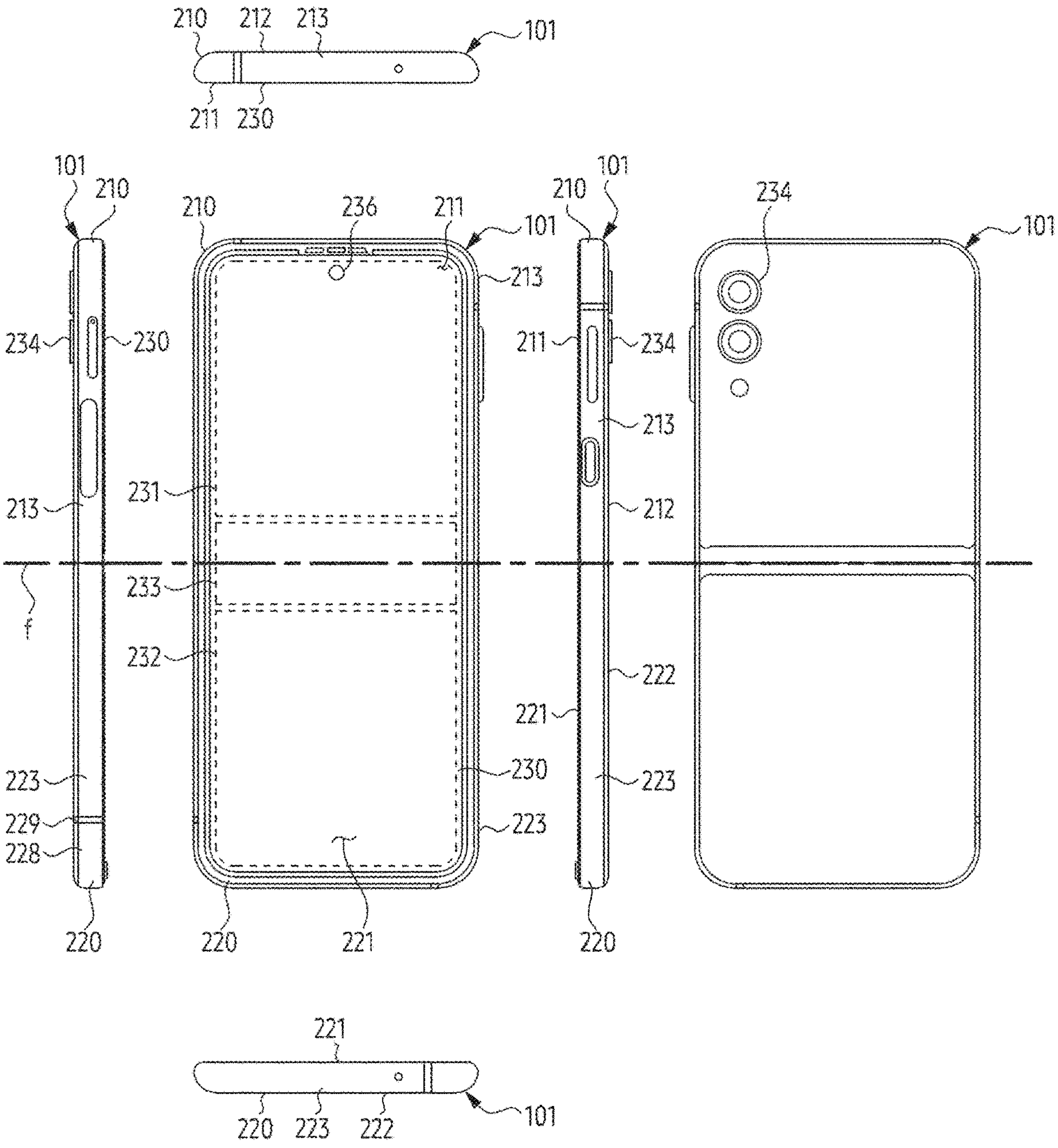
FIG. 2A illustrates an unfolded state of an electronic device according to an embodiment of the disclosure.

FIG. 2A illustrates an unfolded state of an electronic device according to an embodiment of the disclosure.

Figure 2B:
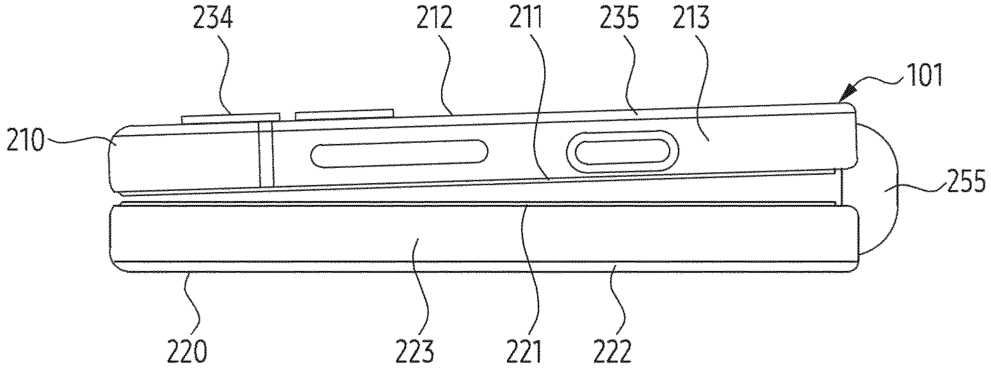
FIG. 2B illustrates a folded state of an electronic device according to an embodiment of the disclosure.

FIG. 2B illustrates a folded state of an electronic device according to an embodiment of the disclosure.

Figure 2C:
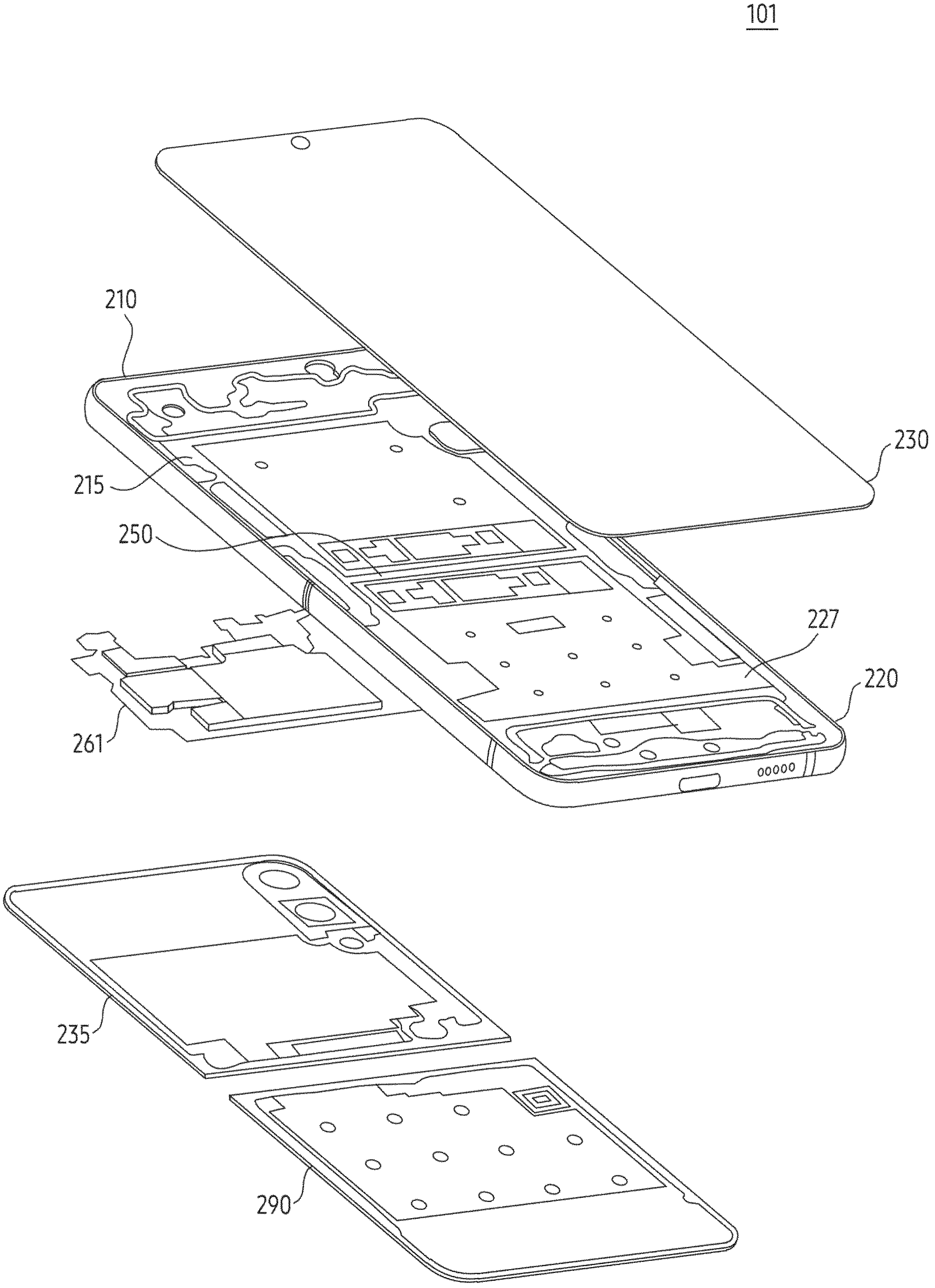
FIG. 2C is an exploded view of an electronic device according to an embodiment of the disclosure.

FIG. 2C is an exploded view of an electronic device according to an embodiment of the disclosure.

Referring to FIGS. 2A, 2B, and 2C, an electronic device 101 according to an embodiment may include a first housing 210, a second housing 220, and a display 230.

In an embodiment, the first housing 210 may include a first surface 211, a second surface 212 opposites to the first surface 211, and a first side surface 213 surrounding at least a portion of the first surface 211 and the second surface 212. In an embodiment, the second housing 220 may further include at least one camera 234 exposed through a portion of the second surface 212 and a display panel 235. In an embodiment, the first housing 210 may provide a space formed by the first surface 211, the second surface 212, and the first side surface 213 as a space for arranging components of the electronic device 101. In an embodiment, the first side surface 213 and a second side surface 223 may include a conductive material, a non-conductive material, or a combination thereof. For example, the first side surface 213 and the second side surface 223 may include a conductive portion 228 and a non-conductive portion 229. The conductive portion 228 may include a plurality of conductive members. The plurality of conductive members may be spaced apart from each other. The non-conductive portion 229 may be disposed between a plurality of conductive members. An antenna structure may be formed by some of a plurality of conductive members and a plurality of non-conductive members or a combination thereof.

In an embodiment, the second housing 220 may include a third surface 221, a fourth surface 222 opposite to the third surface 221, and a second side surface 223 surrounding at least a portion of the third surface 221 and the fourth surface 222. In an embodiment, the fourth surface 222 may further include a rear plate 290 disposed on the fourth surface 222.

In an embodiment, the second side surface 223 may be rotatably (or pivotably) connected to the first side surface 213 through a hinge structure 250 disposed on a hinge cover 255. The hinge structure 250 may include a hinge plate. For example, the hinge plate may include a first hinge plate and a second hinge plate. The first hinge plate may be connected to the first housing 210. The second hinge plate may be connected to the second housing 220. In an embodiment, the second housing 220 may provide a space formed by the third surface 221, the fourth surface 222 opposite the third surface 221, and the second side surface 223 surrounding at least a portion of the third surface 221 and the fourth surface 222 as a space for arranging components of the electronic device 101. In an embodiment, the display 230 may include a window exposed toward the outside. The window may protect a surface of the display 230. The window may be formed of a transparent member to transfer visual information provided from the display 230 to the outside. The window may include a glass material such as ultra-thin glass (UTG) or a polymer material such as polyimide (PI). In an embodiment, the display 230 may include a first display area 231 disposed on the first surface 211 of the first housing, a second display area 232 disposed on the third surface 221 of the second housing, and a third display area 233 between the first display area 231 and the second display area 232. At least a portion of the third display area 233 may be disposed on the hinge structure 250.

According to an embodiment, an opening may be formed in a portion of a screen display area of the display 230, or a recess or an opening may be formed in a support member (e.g., bracket) supporting the display 230. The electronic device 101 may include at least one camera aligned with the recess or the opening. For example, the first display area 231 may further include at least one camera 236 capable of obtaining an image from the outside through a portion of the first display area 231. According to an embodiment, the electronic device 101 may include at least one camera 236 on a rear surface of the display 230 corresponding to the first display area 231 or the second display area 232 of the display 230. For example, at least one camera 236 may be disposed under the display 230 and may be surrounded by the display 230. The at least one camera 236 may not be exposed to the outside by being surrounded by the display 230. However, it is not limited thereto, and the display 230 may include an opening exposing the at least one camera 236 to the outside. Although not illustrated in FIGS. 2A and 2B, in an embodiment, the display 230 may further include the rear surface opposite to a front surface. In an embodiment, the display 230 may be supported by a first support member 215 of the first housing 210 and a second support member 227 of the second housing 220.

In an embodiment, the hinge structure 250 may be configured to rotatably connect the first support member 215 fastened to the first hinge plate and the second support member 227 fastened to the second hinge plate. In an embodiment, the hinge cover 255 surrounding the hinge structure 250 may be exposed at least partially through a space between the first housing 210 and the second housing 220 while the electronic device 101 is in a folded state. In an embodiment, the hinge cover 255 may be covered by the first housing 210 and the second housing 220 while the electronic device 101 is in an unfolded state.

In an embodiment, the electronic device 101 may be folded about a folding axis f passing through the hinge cover 255. For example, the hinge cover 255 may be disposed between the first housing 210 and the second housing 220 of the electronic device 101 so that the electronic device 101 may be bent, curved, or folded. For example, the first housing 210 may be rotatably connected to the second housing 220 through the hinge structure 250 disposed on the hinge cover 255. For example, the first housing 210 may rotate about the folding axis f.

In an embodiment, the electronic device 101 may be folded so that the first housing 210 and the second housing 220 face each other by rotating about the folding axis f. In an embodiment, the electronic device 101 may be folded so that the first housing 210 and the second housing 220 are stacked on each other or overlapped with each other. In the disclosure, the expression "a component faces another component" may be referred to as the component and the other component being disposed in a location in which a direction toward which the component faces and a direction toward which the other component faces are opposite to each other.

Referring to FIG. 2C, the electronic device 101 may include a first housing 210, a second housing 220, a hinge structure 250, a display 230, a printed circuit board 261, a display panel 235, and a rear plate 290. According to an embodiment, the electronic device 101 may omit at least one of the components or may additionally include another component.

According to an embodiment, the hinge structure 250 may include a hinge plate. For example, the hinge structure 250 may include a hinge gear enabling the first housing 210 and the second housing 220 to be pivotable.

According to an embodiment, a first support member 215 may be partially surrounded by a first side surface 213. For example, the first support member 215 may be integrally formed with the first side surface 213. According to an embodiment, a second support member 227 may be partially surrounded by a second side surface 223. For example, the second support member 227 may be integrally formed with the second side surface 223. However, it is not limited thereto. For example, the first support member 215 may be formed separately from the first side surface 213. For example, the second support member 227 may be formed separately from the second side surface 223.

According to an embodiment, a surface of the first support member 215 may be coupled with the display 230. Another surface of the first support member 215 may be coupled with the display panel 235. A surface of the second support member 227 may be coupled with the display 230. Another surface of the second support member 227 may be coupled with the rear plate 290.

According to an embodiment, the printed circuit board 261 and the battery may be disposed between a surface formed by the first support member 215 and the second support member 227 and a surface formed by the display panel 235 and the rear plate 290. The printed circuit board 261 may be electrically connected to components for implementing various functions of the electronic device 101.

Figure 3:
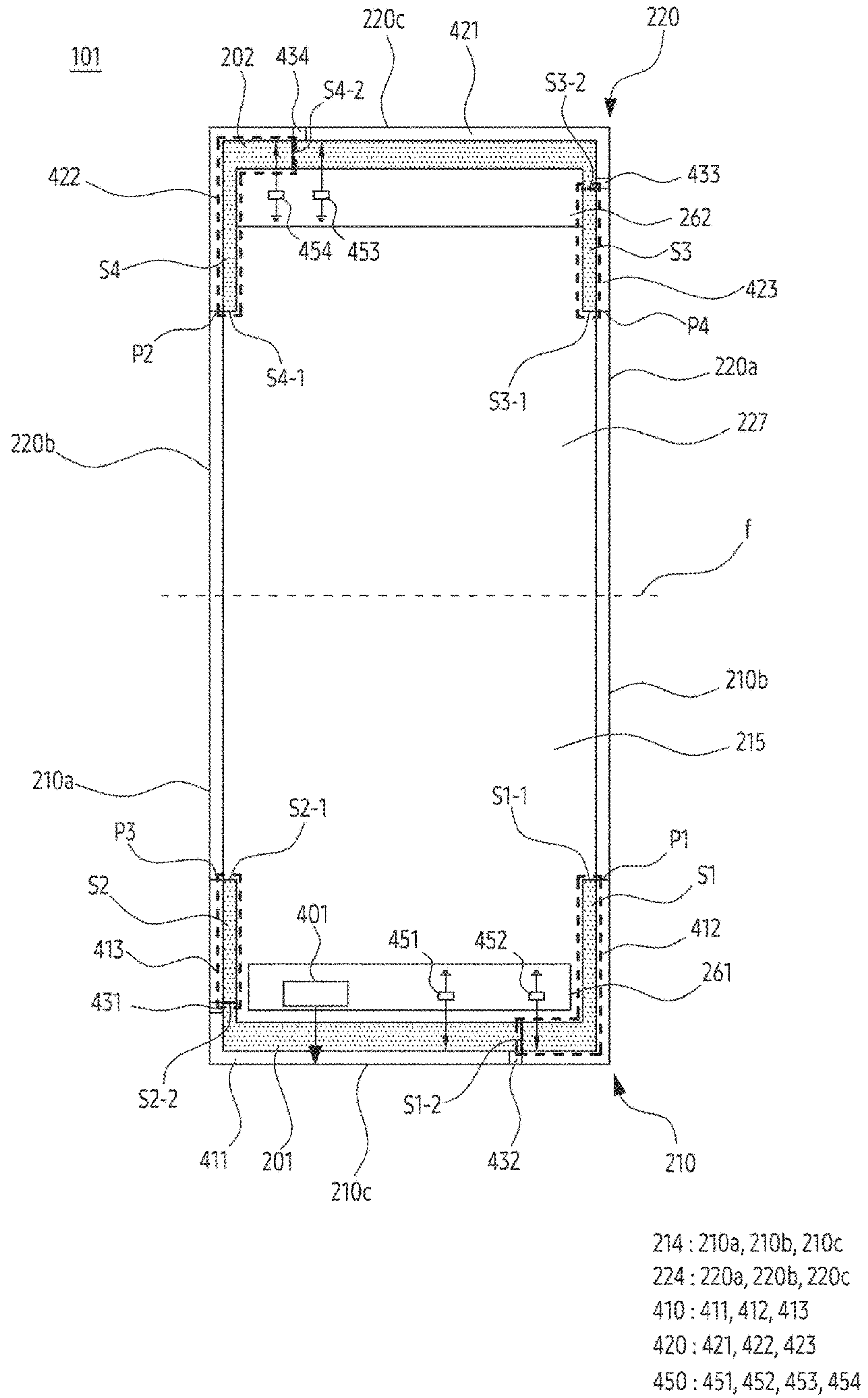
FIG. 3 schematically illustrates an electronic device according to an embodiment of the disclosure.

FIG. 3 schematically illustrates an electronic device according to an embodiment of the disclosure.

Figure 4A:
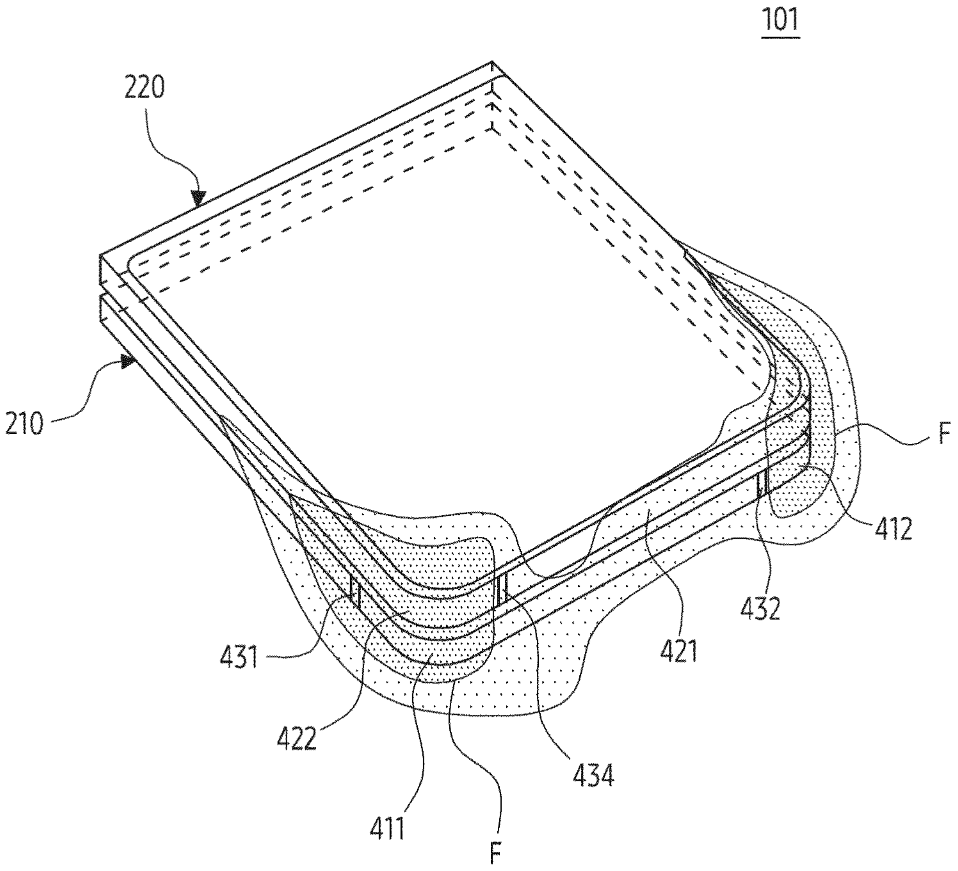
FIGS. 4A and 4B are perspective views of an electronic device in a folded state according to various embodiments of the disclosure.
Figure 4B:
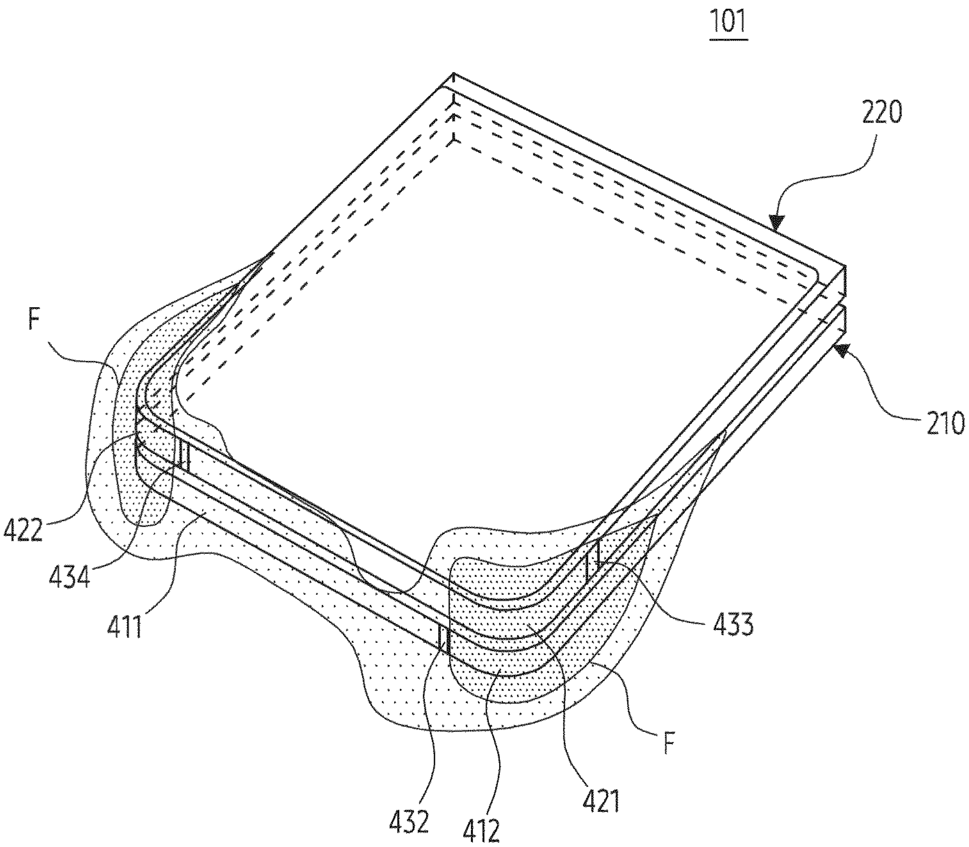

FIGS. 4A and 4B are perspective views of an electronic device in a folded state according to various embodiments of the disclosure.

Figure 4C:
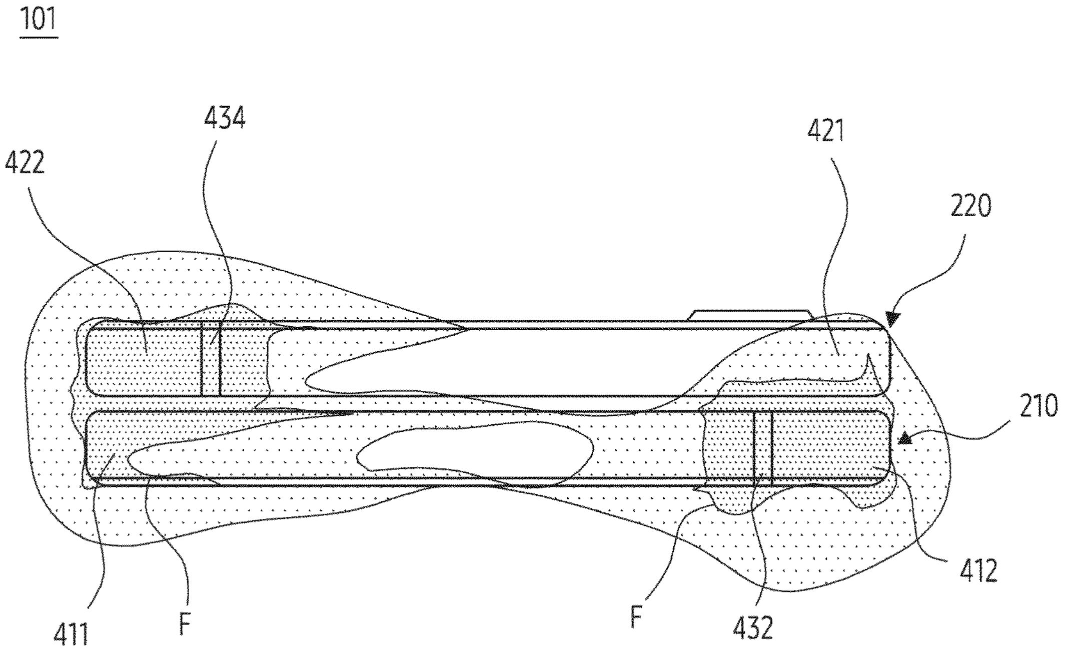
FIG. 4C is a front view of an electronic device in a folded state according to an embodiment of the disclosure.

FIG. 4C is a front view of an electronic device in a folded state according to an embodiment of the disclosure.

Referring to FIG. 3, an electronic device 101 according to an embodiment may include a first housing 210, a second housing 220, and/or communication circuitry 401.

The electronic device 101 according to an embodiment may include a first housing 210 and a second housing 220 that may be folded or unfolded with each other. The electronic device 101 according to an embodiment may be referred to as a foldable electronic device 101. For example, the second housing 220 may rotate with respect to the first housing 210 about a folding axis f. For example, the electronic device 101 may include a hinge structure (e.g., the hinge structure 250 of FIG. 2C). The hinge structure 250 may enable the electronic device 101 to be switched to a folded state or an unfolded state by rotatably connecting the first housing 210 and the second housing 220 with respect to the folding axis f.

According to an embodiment, the communication circuitry 401 may be disposed in the first housing 210 or the second housing 220. For example, the communication circuitry 401 may be disposed on a first printed circuit board 261 in the first housing 210. However, it is not limited thereto. The communication circuitry 401 may be configured to wirelessly communicate with an external electronic device. The communication circuitry 401 may be configured to receive a signal from an external electronic device through an antenna and/or transmit a signal to an external electronic device through the antenna.

According to an embodiment, the first housing 210 may include a first side member 214 (or a first side bezel) including a first periphery 210*a*, a second periphery 210*b*, and a third periphery 210*c*. For example, the first periphery 210*a* may be perpendicular to the folding axis f. The first periphery 210*a* may include a first non-conductive portion 431. For example, the second periphery 210*b* may be perpendicular to the folding axis f. The second periphery 210*b* may be opposites to the first periphery 210*a*. For example, the third periphery 210*c* may be spaced apart from the folding axis f. The third periphery 210*c* may be parallel to the folding axis f. The third periphery 210*c* may be disposed between the first periphery 210*a* and the second periphery 210*b*. For example, the third periphery 210*c* may extend from an end of the first periphery 210*a* to an end of the second periphery 210*b*. The third periphery 210*c* may include a second non-conductive portion 432.

According to an embodiment, the second housing 220 may include a second side member 224 (or a second side bezel) including a fourth periphery 220*a*, a fifth periphery 220*b*, and a sixth periphery 220*c*. For example, the fourth periphery 220*a* may be perpendicular to the folding axis f. The fourth periphery 220*a* may include a third non-conductive portion 433. For example, the fifth periphery 220*b* may be perpendicular to the folding axis f. The fifth periphery 220*b* may be opposite to the fourth periphery 220*a*. For example, the sixth periphery 220*c* may be spaced apart from the folding axis f. The sixth periphery 220*c* may be parallel to the folding axis f. The sixth periphery 220*c* may be disposed between the fourth periphery 220*a* and the fifth periphery 220*b*. For example, the sixth periphery 220*c* may extend from an end of the fourth periphery 220*a* to an end of the fifth periphery 220*b*. The sixth periphery 220*c* may include a fourth non-conductive portion 434.

For example, when the electronic device 101 is in a folded state, the third periphery 210*c* may face the sixth periphery 220*c*. In the folded state, the first periphery 210*a* may face the fifth periphery 220*b*. In the folded state, the second periphery 210*b* may face the fourth periphery 220*a*. For example, when the electronic device 101 is in an unfolded state, the third periphery 210*c* may be opposite to the sixth periphery 220*c*. In the unfolded state, the first periphery 210*a* may be disposed on substantially the same line as the fifth periphery 220*b*.

In an embodiment, a first support member 215 may be partially connected to the first side member 214. For example, the first support member 215 may be spaced apart from the third periphery 210*c*. For example, the first support member 215 may be connected to a portion of the first periphery 210*a*. The first support member 215 may be spaced apart from another portion of the first periphery 210*a*. A boundary between the portion of the first periphery 210*a* connected to the first support member 215 and the other portion of the first periphery 210*a* spaced apart from the first support member 215 may be referred to as a location P3 of FIG. 3. For example, the first support member 215 may be connected to a portion of the second periphery 210*b*. The first support member 215 may be spaced apart from another portion of the second periphery 210*b*. A boundary of the portion of the second periphery 210*b* connected to the first support member 215 and the other portion of the second periphery 210*b* spaced apart from the first support member 215 may be referred to as a location P1 of FIG. 3.

In an embodiment, the second support member 227 may be partially connected to the second side member 224. For example, the second support member 227 may be spaced apart from the sixth periphery 220*c*. For example, the second support member 227 may be connected to a portion of the fourth periphery 220*a*. The second support member 227 may be spaced apart from another portion of the fourth periphery 220*a*. A boundary of the portion of the fourth periphery 220*a* connected to the second support member 227 and the other portion of the fourth periphery 220*a* connected to the second support member 227 may be referred to as a location P4 of FIG. 3. For example, the second support member 227 may be connected to a portion of the fifth periphery 220*b*. The second support member 227 may be spaced apart from another portion of the fifth periphery 220*b*. A boundary of the portion of the fifth periphery 220*b* connected to the second support member 227 and the other portion of the fifth periphery 220*b* connected to the second support member 227 may be referred to as a location P2 of FIG. 3.

According to an embodiment, the first housing 210 and the second housing 220 may include a plurality of conductive portions. For example, the first housing 210 may include a first conductive portion 411, a second conductive portion 412, and/or a third conductive portion 413. The first conductive portion 411 may extend from a first non-conductive portion 431 to a second non-conductive portion 432. For example, the first conductive portion 411 may extend from the first non-conductive portion 431 in the first periphery 210*a* to the second non-conductive portion 432 in the third periphery 210*c* along the first periphery 210*a* and the third periphery 210*c*. The second conductive portion 412 may extend from the second non-conductive portion 432 to a location P1 of the second periphery 210*b*. For example, the second conductive portion 412 may extend from the second non-conductive portion 432 in the third periphery 210*c* along the third periphery 210*c* and the second periphery 210*b* to a location P1 where the second periphery 210*b* and the first side member 214 are connected. For example, the third conductive portion 413 may extend from the first non-conductive portion 431 toward the folding axis f along the first periphery 210*a*. However, it is not limited thereto.

The electronic device 101 according to an embodiment may include a first opening area 201 disposed between the first side member 214 and the first support member 215 and a second opening area 202 disposed between the second side member 224 and the second support member 227. For example, the first opening area 201 and the second opening area 202 may be filled with a non-conductive material. For example, the first side member 214 may be spaced apart from the first support member 215 through the first opening area 201 disposed between the first side member 214 and the first support member 215. According to an embodiment, the first opening area 201 may include a first slot S1 and a second slot S2, which are partial areas within the first opening area 201. For example, the first slot S1 may be formed between the second conductive portion 412 and the first support member 215. For example, an end S1-1 of the first slot S1 may be located between a location P1 in the second periphery 210*b* and the first support member 215. Another end S1-2 of the first slot S1 may be located between an end of the second conductive portion 412 in contact with the second non-conductive portion 432 and the first support member 215. For example, the second slot S2 may be disposed between the third conductive portion 413 and the first support member 215. For example, an end S2-1 of the second slot S2 may be located between a location P3 in the first periphery 210*a* and the first support member 215. Another end S2-2 of the second slot S2 may be located between an end of the third conductive portion 413 in contact with the first non-conductive portion 431 and the first support member 215. The end S1-1 and the other end S1-2 of the first slot S1 and the end S2-1 and the other end S2-2 of the second slot S2 may be referred to as a boundary for distinguishing the first slot S1 and the second slot S2 within the first opening area 201, rather than a physical boundary or including a material different from other portions within the first opening area 201.

For example, the second housing 220 may include a fourth conductive portion 421, a fifth conductive portion 422, and/or a sixth conductive portion 423. The fourth conductive portion 421 may extend from the third non-conductive portion 433 to the fourth non-conductive portion 434. For example, the fourth conductive portion 421 may extend from the third non-conductive portion 433 in the fourth periphery 220*a* to the fourth non-conductive portion 434 in the sixth periphery 220*c* along the fourth periphery 220*a* and the sixth periphery 220*c*. The fifth conductive portion 422 may extend from the fourth non-conductive portion 434 to a location P2 of the fifth periphery 220*b*. For example, the fifth conductive portion 422 may extend from the fourth non-conductive portion 434 in the sixth periphery 220*c* along the sixth periphery 220*c* and the fourth periphery 220*a* to the location P2 where the fourth periphery 220*a* and the second side member 224 are connected. The sixth conductive portion 423 may extend from the third non-conductive portion 433 toward the folding axis f along the fourth periphery 220*a*. However, it is not limited thereto.

According to an embodiment, the second side member 224 may be spaced apart from the second support member 227 through the second opening area 202 disposed between the second side member 224 and the second support member 227. According to an embodiment, the second opening area 202 may include a third slot S3 and a fourth slot S4, which are partial areas within the second opening area 202. For example, the third slot S3 may be formed between the sixth conductive portion 423 and the second support member 227. For example, an end S3-1 of the third slot S3 may be located between a location P4 in the fourth periphery 220*a* and the second support member 227. For example, another end S3-2 of the third slot S3 may be located between an end of the sixth conductive portion 423 in contact with the third non-conductive portion 433 and the second support member 227. For example, the fourth slot S4 may be disposed between the fifth conductive portion 422 and the second support member 227. For example, an end S4-1 of the fourth slot S4 may be located between a location P2 in the fifth periphery 220*b* and the second support member 227. Another end S4-2 of the fourth slot S4 may be located between an end of the fifth conductive portion 422 in contact with the fourth non-conductive portion 434 and the second support member 227. The end S3-1 and the other end S3-2 of the third slot S3 and the end S4-1 and the other end S4-2 of the fourth slot S4 may be referred to as a boundary for distinguishing the third slot S3 and the fourth slot S4 within the second opening area 202, rather than a physical boundary or including a material different from other portions within the second opening area 202.

According to an embodiment, the slots S1, S2, S3, and S4 may include a non-conductive material (e.g., resin and/or polymer). For example, the slots S1, S2, S3, and S4 may be understood as a term indicating a non-conductive portion disposed in an opening between conductive portions 410 of the first housing 210 and the first support member 215 and between conductive portions 420 of the second housing 220 and the second support member 227. In the disclosure, the meaning of the term "slot" is not limited to the term itself and may also be referred to as a slit, an opening, or an opening slit.

According to an embodiment, the conductive portions 410 of the first housing 210 and the conductive portions 420 of the second housing 220 may operate as antenna radiators capable of transmitting and/or receiving signals within a designated frequency range. For example, the second conductive portion 412 and the first slot S1 may be referred to as a slot antenna capable of transmitting and/or receiving signals. According to an embodiment, a length of the first slot S1 may correspond to a length of the fourth slot S4. According to an embodiment, a length of the second slot S2 may correspond to a length of the third slot S3. However, it is not limited thereto. In an embodiment, lengths of the slots S1, S2, S3, and S4 may be determined based on permittivity of a resin included in the slots S1, S2, S3, and S4 and a designated frequency range. For example, a length of the first slot S1 may have approximately a quarter wavelength for a signal with a resonant frequency of an antenna including the second conductive portion 412 and the first slot S1, but is not limited thereto.

According to an embodiment, in an unfolded state, the communication circuitry 401 may be configured to feed at least one of the conductive portions 410 of the first housing 210 and/or at least one of the conductive portions 420 of the second housing 220. The communication circuitry 401 may communicate with an external electronic device, through an antenna including at least one of the conductive portions 410 of the first housing 210 and/or an antenna including at least one of the conductive portions 420 of the second housing 220.

According to an embodiment, since the first housing 210 and the second housing 220 may be disposed close to each other in the folded state, an electromagnetic interaction between the first housing 210 and the second housing 220 may occur. The electronic device 101 according to an embodiment may be configured to communicate with an external electronic device through an electromagnetic field F formed by an electromagnetic interaction among the conductive portions 410 of the first housing 210, the conductive portions 420 of the second housing 220, and the slots S1, S2, S3, and S4.

Referring to FIG. 4A, when the electronic device 101 is in the folded state, the first side member 214 and the second side member 224 may face each other. In the folded state, when the electronic device 101 is viewed in a direction from the second housing 220 toward the first housing 210, the first non-conductive portion 431 may be disposed to overlap the fifth conductive portion 422. In the folded state, when the electronic device 101 is viewed in a direction from the second housing 220 toward the first housing 210, the second non-conductive portion 432 may be disposed to overlap the fourth conductive portion 421.

Referring to FIG. 4B, in the folded state, when the electronic device 101 is viewed in a direction from the second housing 220 toward the first housing 210, the third non-conductive portion 433 may be located to overlap the first conductive portion 411. In the folded state, when the electronic device 101 is viewed in a direction from the second housing 220 toward the first housing 210, the fourth non-conductive portion 434 may be disposed to overlap the second conductive portion 412. Through an electromagnetic field F formed at the structure, the communication circuitry 401 may be configured to wirelessly communicate with an external electronic device in the folded state.

The electronic device 101 according to an embodiment may include impedance matching circuitry 450 configured to adjust a resonant frequency of an antenna by adjusting an impedance value of the first conductive portion 411, the second conductive portion 412, the fourth conductive portion 421, and/or the fifth conductive portion 422. For example, the electronic device 101 may include first impedance matching circuitry 451 electrically connected to the first conductive portion 411, second impedance matching circuitry 452 electrically connected to the second conductive portion 412, third impedance matching circuitry 453 electrically connected to the fourth conductive portion 421, and/or fourth impedance matching circuitry 454 electrically connected to the fifth conductive portion 422. For example, the first impedance matching circuitry 451 and the second impedance matching circuitry 452 may be disposed on a first printed circuit board 261 in the first housing 210. For example, the third impedance matching circuitry 453 and the fourth impedance matching circuitry 454 may be disposed on a second printed circuit board 262 in the second housing 220. However, it is not limited thereto. According to an embodiment, the communication circuitry 401 may adjust a resonant frequency of an antenna through the impedance matching circuitry 450.

According to an embodiment, in the folded state, since the conductive portions 410 of the first housing 210 and the conductive portions 420 of the second housing 220 are disposed close to each other, an electromagnetic interaction among the conductive portions 410 of the first housing 210, the conductive portions 420 of the second housing 220, and the slots S1, S2, S3, and S4 may occur. In an embodiment, when the electronic device 101 is possessed by a user in the folded state, the communication circuitry 401 may be configured to transmit and/or receive a signal with an external electronic device using the electromagnetic interaction.

According to an embodiment, the communication circuitry 401 may be configured to transmit a signal to an external electronic device based on feeding the first conductive portion 411 in the folded state. For example, in the folded state, when the communication circuitry 401 feeds the first conductive portion 411, a radiation current may flow along the first conductive portion 411. An electromagnetic field F formed by the radiation current flowing along the first conductive portion 411 may be formed at the first conductive portion 411. Referring to FIGS. 4A, 4B, and 4C, the electromagnetic field F formed at the first conductive portion 411 may be excited to the first slot S1 and the fourth slot S4 located on both sides of the first conductive portion 411. The communication circuitry 401 may communicate with an external electronic device through the electromagnetic field F excited to the first slot S1 and the fourth slot S4. For example, since the second non-conductive portion 432 contacts the first conductive portion 411, an electromagnetic field F formed along the second conductive portion 412 may be excited to the first slot S1 between the second conductive portion 412 in contact with the second non-conductive portion 432 and the first support member 215. For example, in the folded state, since the fourth non-conductive portion 434 overlaps the first conductive portion 411, the electromagnetic field F formed at the first conductive portion 411 may be excited to the fourth slot S4 between the fifth conductive portion 422 in contact with the fourth non-conductive portion 434 and the second support member 227.

According to an embodiment, the communication circuitry 401 may communicate with an external electronic device through the electromagnetic field F. By the electromagnetic field F, the first conductive portion 411, the second conductive portion 412, and the fifth conductive portion 422 may operate as an antenna capable of transmitting and/or receiving signals within a designated frequency band. The electronic device 101 according to an embodiment may have a structure in which the electromagnetic field F may be formed, in the folded state. Since the electronic device 101 may communicate with an external electronic device through the electromagnetic field F in the folded state, wireless communication performance may be improved. Since the conductive portions 410 of the first housing 210 and the conductive portions 420 of the second housing 220 do not need to have a structure symmetrical to each other, configuration and design of the electronic device 101 may be facilitated.

Figure 5:
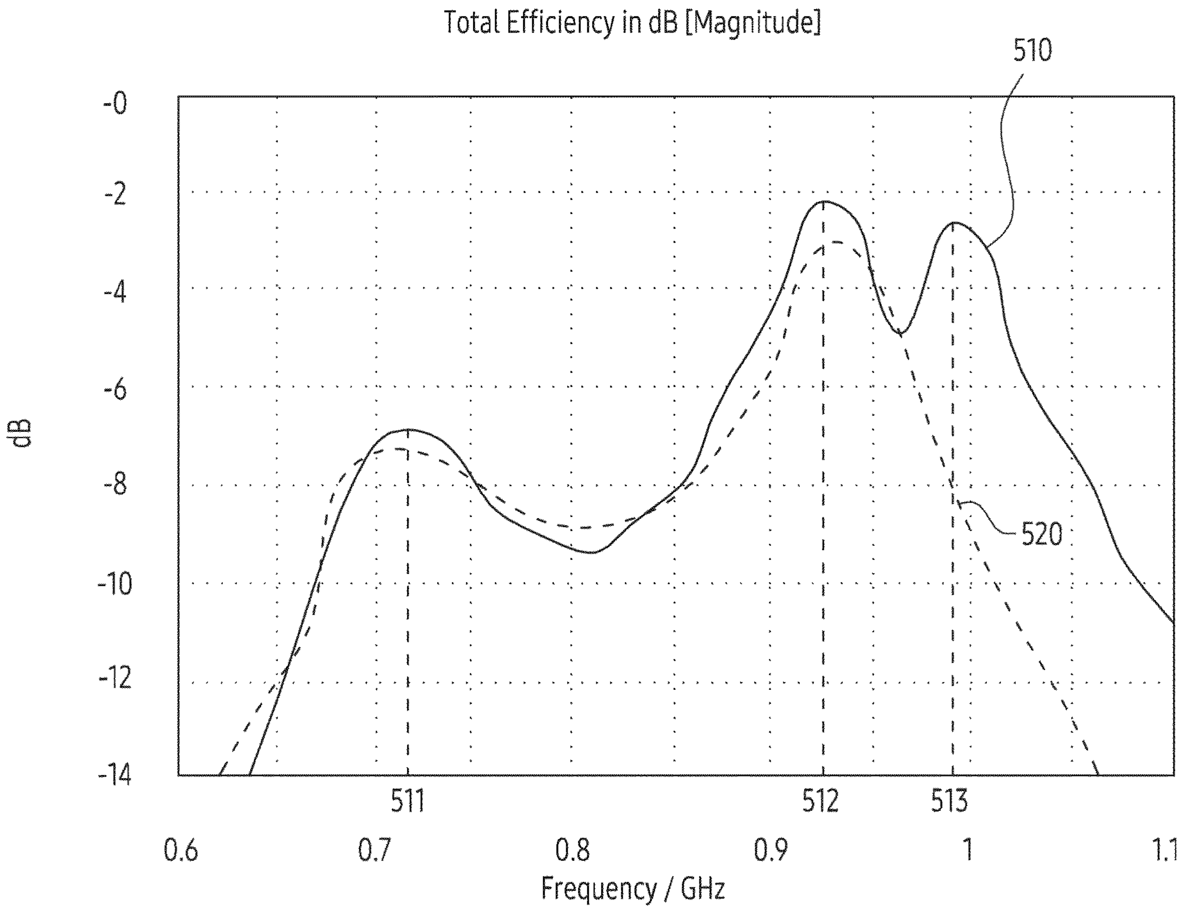
FIG. 5 is a graph illustrating a radiation characteristic of an electronic device in a folded state according to an embodiment of the disclosure.

FIG. 5 is a graph illustrating a radiation characteristic of an electronic device in a folded state according to an embodiment of the disclosure.

A first graph 510 of FIG. 5 indicates a radiation characteristic of an electronic device (e.g., the electronic device 101 of FIG. 3) according to an embodiment when the electronic device 101 is in a folded state. A second graph 520 indicates a radiation characteristic of an electronic device according to a comparative example when the electronic device is in the folded state. A horizontal axis of the graph is frequency (unit: GHz), and a vertical axis of the graph is gain (unit: dB).

Referring to FIG. 5, in the folded state of the electronic device 101 according to an embodiment, an electromagnetic field formed when the communication circuitry 401 feeds a first conductive portion (e.g., the first conductive portion 411 of FIG. 3) may have a radiation characteristic by an electromagnetic interaction between conductive portions (e.g., the conductive portions 410 of FIG. 3) of a first housing (e.g., the first housing 210 of FIG. 3) and conductive portions (e.g., the conductive portions 420 of FIG. 3) of a second housing (e.g., the second housing 220 of FIG. 3). The first conductive portion 411, the second conductive portion 412, and the fifth conductive portion 422 may operate as an antenna capable of transmitting and/or receiving signals within a designated frequency band by an electromagnetic field formed when the communication circuitry 401 feeds the first conductive portion 411.

Referring to the first graph 510 of FIG. 5, in the folded state, three resonant frequencies may be identified. For example, the three resonant frequencies may include a first resonant point 511, a second resonant point 512, and a third resonant point 513.

For example, as the communication circuitry 401 feeds the first conductive portion 411, a radiation current may flow along the first conductive portion 411. An electromagnetic field may be formed at the first conductive portion 411 by the radiation current flowing along the first conductive portion 411. The first resonant point 511 may be formed by an electromagnetic field formed at the first conductive portion 411. For example, the first resonant point 511 may be about 0.7 to 0.8 GHz, but is not limited thereto.

For example, as the communication circuitry 401 feeds the first conductive portion 411, the electromagnetic field formed at the first conductive portion 411 may be excited to the first support member 215 and/or the second support member 227 in the folded state. The electromagnetic field excited to the first support member 215 and/or the second support member 227 may be formed along at least a portion of the first support member 215 and/or at least a portion of the second support member 227. The second resonant point 512 may be formed by the electromagnetic field formed along at least a portion of the first support member 215 and/or at least a portion of the second support member 227. For example, the second resonant point 512 may be about 0.9 to 0.95 GHz, but is not limited thereto.

For example, as the communication circuitry 401 feeds the first conductive portion 411, the electromagnetic field formed at the first conductive portion 411 may be excited to the first slot S1 and the fourth slot S4 in the folded state. The electromagnetic field excited to the first slot S1 may be formed on at least a portion of the second conductive portion 412. The electromagnetic field excited to the fourth slot S4 may be formed on at least a portion of the fifth conductive portion 422. The third resonant point 513 may be formed by the electromagnetic field excited to the first slot S1 and the fourth slot S4. For example, the third resonant point 513 may be about 0.95 to about 1.0 GHz, but is not limited thereto.

According to an embodiment, the processor 120 and/or the communication circuitry 401 may move the third resonant point 513. For example, based on a targeted frequency band, the processor 120 and/or the communication circuitry 401 may move the third resonant point 513 into the frequency band. The processor 120 and/or the communication circuitry 401 may adjust impedance of the conductive portions 410 of the first housing 210 and/or the conductive portions 420 of the second housing 220 through impedance matching circuitry (e.g., the impedance matching circuitry 450 of FIG. 3). As the impedance of the conductive portions 410 and 420 is adjusted, the third resonant point 513 may be moved. The processor 120 and/or the communication circuitry 401 may adjust frequencies of a signal to be transmitted to an external electronic device and a signal to be received from an external electronic device at the third resonant point 513, by moving the third resonant point 513, through the impedance matching circuitry 450.

The electronic device 101 having a first housing 210 and a second housing 220, which are rotatably connected to each other, may be used in a folded state, an unfolded state, or an intermediate state between the folded state and the unfolded state. Various states of the electronic device 101 may provide the user with various usage forms. According to an embodiment, since the first housing 210 and the second housing 220 are disposed close to each other in the folded state, an interaction between conductive portions of the first housing 210 and conductive portions of the second housing 220 may affect wireless communication performance of the electronic device 101. In the folded state, the electronic device 101 according to an embodiment may have improved wireless communication performance by using an electromagnetic field formed through the electromagnetic interaction between the conductive portions of the first housing 210 and the conductive portions of the second housing 220.

Referring to the first graph 510 of FIG. 5, the electronic device 101 according to an embodiment may transmit and/or receive a signal having a frequency within a low band (e.g., about 1 GHz or less) through an electromagnetic field. When the electronic device 101 is in the folded state, the communication circuitry 401 may feed the first conductive portion 411 to transmit and/or receive a signal having a frequency within a low band. The communication circuitry 401 may communicate with an external electronic device through an electromagnetic field formed by feeding the first conductive portion 411. The electronic device 101 according to an embodiment may have a structure capable of implementing the third resonant point 513 in the folded state. In an embodiment, the electronic device 101 may communicate with an external electronic device using an electromagnetic field coupled to the first slot S1 and the fourth slot S4. When using the electromagnetic field coupled to the first slot S1 and the fourth slot S4, the processor 120 and/or the communication circuitry 401 may adjust the third resonant point 513 through impedance matching circuitry (e.g., the impedance matching circuitry 450 of FIG. 3). The processor 120 and/or the communication circuitry 401 may move (e.g., out-band) the first resonant point 511 out of a targeted frequency band through the impedance matching circuitry 450 when communicating with an external electronic device based on the third resonant point 513. An example of an operation in which the processor 120 and/or the communication circuitry 401 adjusts the impedance matching circuitry 450 for tuning the third resonant frequency will be illustrated through FIGS. 6A, 6B, and 6C.

Referring to the second graph 520 of FIG. 5, an electronic device according to a comparative example may be referred to as an electronic device having a structure in which conductive portions of the first housing and conductive portions of the second housing correspond to each other in the folded state. For example, non-conductive portions (e.g., the first non-conductive portion 431, the second non-conductive portion 432, the third non-conductive portion 433, or the fourth non-conductive portion 434) included in the first housing and the second housing may be disposed to overlap each other. According to the comparative example, since the electromagnetic interaction is reduced, the coupled third resonant point 513 may not be formed. For example, when the non-conductive portions of the first housing and the non-conductive portions of the second housing correspond to or overlap each other in the folded state, the third resonant point by coupling of an electromagnetic field is not formed. Referring to the second graph 520, since the electronic device according to the comparative example cannot use the coupled electromagnetic field, a gain of the signal having the frequency in the lower band may be lower than that of the first graph 510.

The electronic device 101 according to an embodiment may have a structure capable of forming an electromagnetic field in the first slot S1 and the fourth slot S4 when feeding the first conductive portion 411 of the first housing 210 in the folded state. According to an embodiment, within the low band, the wireless communication performance (e.g., sensitivity or bandwidth) of the electronic device 101 may be improved.

Figure 6A:
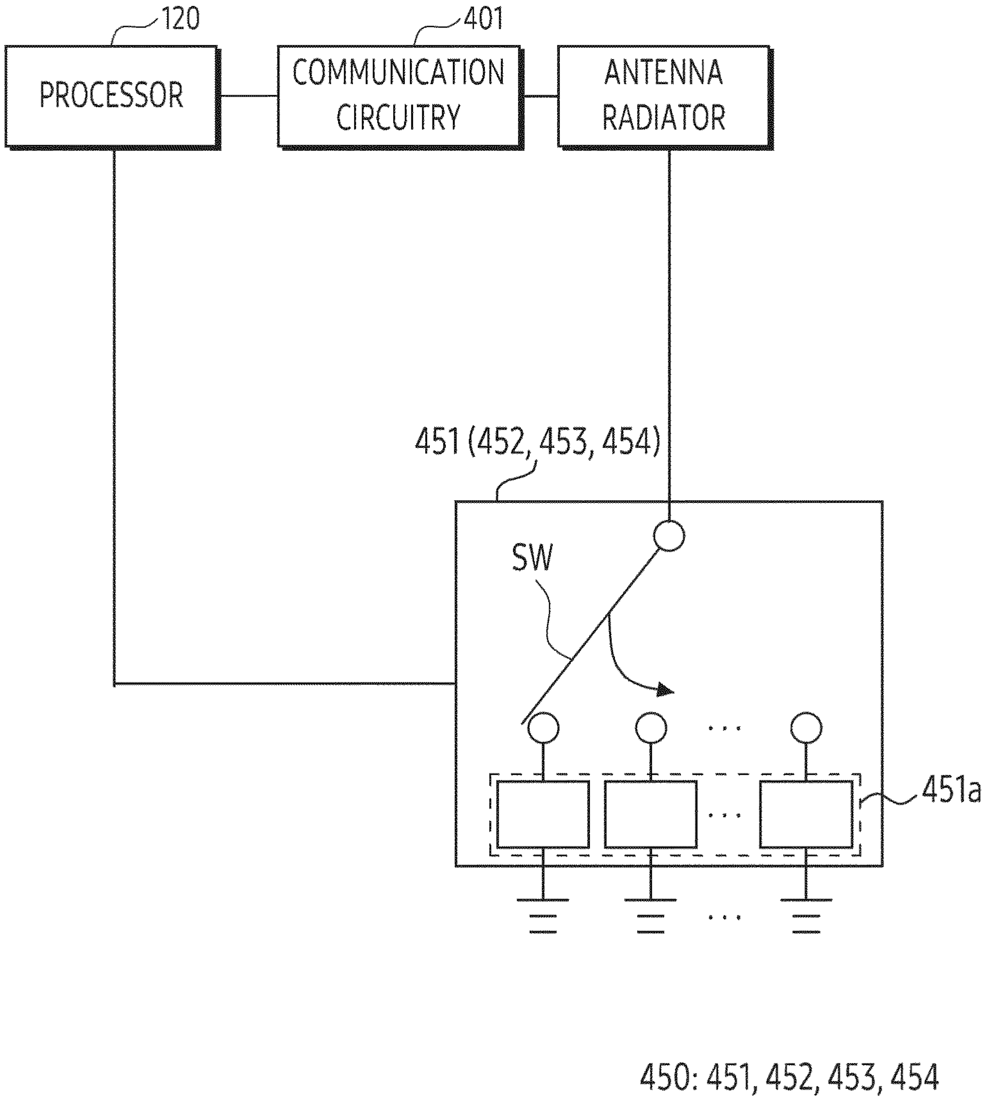
FIG. 6A is a simplified block diagram of an electronic device according to an embodiment of the disclosure.

FIG. 6A is a simplified block diagram of an electronic device according to an embodiment of the disclosure.

Figure 6B:
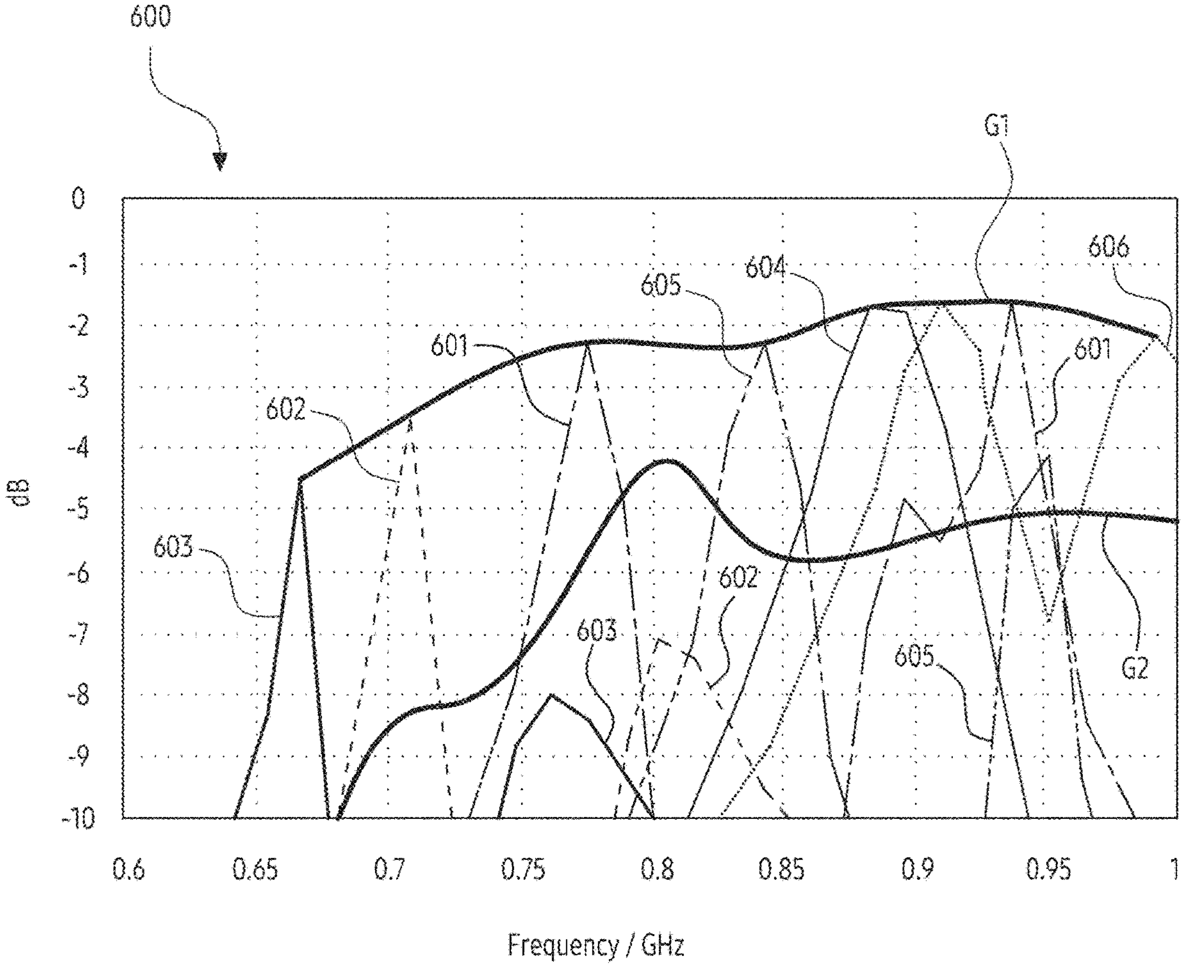
FIG. 6B is a graph illustrating a radiation characteristic of an electronic device by adjusting an impedance value of conductive portions in a folded state of an electronic device according to an embodiment of the disclosure.

FIG. 6B is a graph illustrating a radiation characteristic of an electronic device by adjusting an impedance value of conductive portions in a folded state of an electronic device according to an embodiment of the disclosure.

Figure 6C:
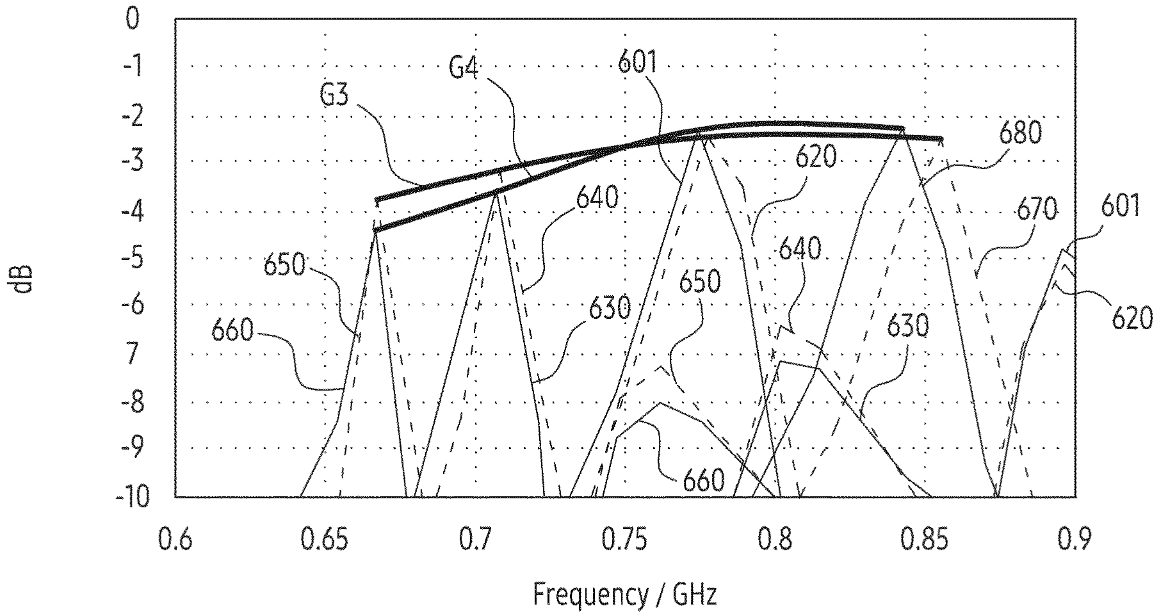
FIG. 6C is a graph illustrating a radiation characteristic of an electronic device by adjusting an impedance value of a first conductive portion in a folded state of an electronic device according to an embodiment of the disclosure.

FIG. 6C is a graph illustrating a radiation characteristic of an electronic device by adjusting an impedance value of a first conductive portion in a folded state of an electronic device according to an embodiment of the disclosure.

Referring to FIG. 6A, an electronic device 101 according to an embodiment may include at least one processor 120 and communication circuitry 401 for wireless communication with an external electronic device. For example, the communication circuitry 401 may include a radio frequency front end (RFFE). For example, the communication circuitry 401 may provide an antenna radiator with a signal to be transmitted to an external electronic device. The communication circuitry 401 may obtain a signal received from the external electronic device to an antenna radiator.

According to an embodiment, a first conductive portion (e.g., the first conductive portion 411 of FIG. 3), a second conductive portion (e.g., the second conductive portion 412 of FIG. 3), a fourth conductive portion (e.g., the fourth conductive portion 421 of FIG. 3), and/or a fifth conductive portion (e.g., the fifth conductive portion 422 of FIG. 3) may operate as an antenna radiator by being fed by the communication circuitry 401. The antenna radiator of FIG. 6A may be referred to as at least one of the conductive portions. When the electronic device 101 transmits a signal to an external electronic device, at least one processor 120 may transmit a signal to the external electronic device through the first conductive portion 411, the second conductive portion 412, the fourth conductive portion 421, and/or the fifth conductive portion 422. When the electronic device 101 receives a signal from an external electronic device, at least one processor 120 may receive a signal through the first conductive portion 411, the second conductive portion 412, the fourth conductive portion 421, and/or the fifth conductive portion 422. The at least one processor 120 may be referred to as the processor 120 of FIG. 1 or a communication processor (CP).

The electronic device 101 according to an embodiment may include impedance matching circuitry 450 configured to adjust a resonant frequency of an antenna by adjusting an impedance value of the first conductive portion 411, the second conductive portion 412, the fourth conductive portion 421, and/or the fifth conductive portion 422. For example, the electronic device 101 may include first impedance matching circuitry 451 electrically connected to the first conductive portion 411, second impedance matching circuitry 452 electrically connected to the second conductive portion 412, third impedance matching circuitry 453 electrically connected to the fourth conductive portion 421, and/or fourth impedance matching circuitry 454 electrically connected to the fifth conductive portion 422. However, it is not limited thereto. According to an embodiment, the at least one processor 120 may adjust a resonant frequency of an antenna through the impedance matching circuitry 450.

Referring to FIG. 6A, the first impedance matching circuitry 451 may include at least one aperture tuner 451*a* and a switch SW connectable to the at least one aperture tuner 451*a* to adjust an impedance value of the first conductive portion 411. For example, the at least one aperture tuner 451*a* may include a plurality of passive components connectable to the switch SW. For example, the at least one aperture tuner 451*a* may include a plurality of capacitors each having a designated capacitance value and/or a plurality of inductors each having a designated inductance value. For example, the first impedance matching circuitry 451 may include four capacitors having different capacitance values. For example, the switch SW may be a single pole four throw (SP4T) switch capable of electrically connecting any one of the four capacitors with the first conductive portion 411. However, it is not limited thereto, and the first impedance matching circuitry 451 may be variously implemented. For example, the switch SW may include a single pole single throw (SPST) switch, a single pole double throw (SPDT), or a single pole triple throw (SP3T). For example, the first impedance matching circuitry 451 may include one or more switches. For example, at least one aperture tuner 451*a* may include a variable capacitor having an adjustable capacitance value and/or a variable inductor having an adjustable inductance value.

According to an embodiment, the first impedance matching circuitry 451 may be operably connected to the at least one processor 120. The at least one processor 120 may be configured to adjust an impedance value of the first conductive portion 411 by controlling the switch SW to be connected to the at least one aperture tuner 451*a*. For example, the at least one processor 120 may identify a resonant frequency of a transmission signal through the communication circuitry 401. When the identified resonant frequency is different from a designated frequency, the at least one processor 120 may electrically connect the first conductive portion 411 to at least one of the plurality of passive components included in the matching circuitry 451 by controlling the switch SW. As the impedance value of the first conductive portion 411 is changed by the electrically connected passive components, the resonant frequency of the transmission signal may be adjusted. For example, the descriptions of the first impedance matching circuitry 451 may be applied substantially equally to the second impedance matching circuitry 452 electrically connected to the second conductive portion 412, the third impedance matching circuitry 453 electrically connected to the fourth conductive portion 421, and the fourth impedance matching circuitry 454 electrically connected to the fifth conductive portion 422. For example, configurations of the first, second, third, and fourth impedance matching circuitry 451, 452, 453, 454 may be variously configured based on a resonant frequency of an antenna.

According to an embodiment, the at least one processor 120 may be configured to adjust a radiation characteristic of the electronic device 101 through the impedance matching circuitry 450 in the folded state. For example, the at least one processor 120 may electrically connect a switch SW in the first impedance matching circuitry 451 to a passive component having a first impedance value, electrically connect a switch SW in the second impedance matching circuitry 452 to a passive component having a second impedance value, and electrically connect a switch SW in the third impedance matching circuitry 453 to a passive component having a third impedance value. For example, in a state that the switch SW in the first impedance matching circuitry 451 is electrically connected to the passive component having the first impedance value, an impedance value of the first impedance matching circuitry 451 may be indicated as the first impedance value.

According to an embodiment, the communication circuitry 401 may be configured to communicate with an external electronic device by using a third resonant point (e.g., the third resonant point 513 of FIG. 5) formed by slots (e.g., the first slot S1, the second slot S2, the third slot S3, and/or the fourth slot S4), conductive portions (e.g., the conductive portions 410 and 420 of FIG. 3) and/or non-conductive portions (e.g., the first non-conductive portion 431, the second non-conductive portion 432, the third non-conductive portion 433, and/or the fourth non-conductive portion 434) of the electronic device 101.

According to an embodiment, the first impedance matching circuitry 451 electrically connected to the first conductive portion 411 may be used to move a first resonant point (e.g., the first resonant point 511 of FIG. 5) out of a designated frequency band (e.g., low band). For example, in order to transmit and/or receive a signal within the designated frequency band using the third resonant point 513, the at least one processor 120 may move the first resonant point 511 out of the band. As the first resonant point 511 moves out of the designated frequency band, the electronic device 101 may transmit and/or receive a signal within the designated frequency band using the third resonant point 513.

According to an embodiment, the first impedance matching circuitry 451 electrically connected to the first conductive portion 411 may be used to adjust a frequency band of the third resonant point 513. For example, in the folded state, the first impedance matching circuitry 451 may adjust an impedance value of the first conductive portion 411 that is fed from the communication circuitry 401. A frequency of the third resonant point 513 may be adjusted according to the impedance value of the first conductive portion 411. For example, the at least one processor 120 may control the first impedance matching circuitry 451 so that the third resonant point 513 is located within a designated frequency band.

According to an embodiment, the at least one processor 120 may be configured to control the second impedance matching circuitry 452 electrically connected to the second conductive portion 412 and/or the fourth impedance matching circuitry 454 electrically connected to the fifth conductive portion 422 for tuning a third resonant point (e.g., the third resonant point 513 of FIG. 5).

Graphs 600 of FIG. 6B indicate a change in radiation characteristic of an electronic device (e.g., the electronic device 101 of FIG. 3) when changing a second impedance value of the second impedance matching circuitry (e.g., the second impedance matching circuitry 452 of FIG. 3) and/or a fourth impedance value of the fourth impedance matching circuitry 454 in a state that a first impedance value of the first impedance matching circuitry 600 is fixed. Referring to FIG. 6B, a first graph 601 illustrates a radiation characteristic of the electronic device 101 when the first impedance value is 1.5 pF, the second impedance value is 1.5 pF, and the fourth impedance value is 1.5 pF. A second graph 602 illustrates a radiation characteristic of the electronic device 101 when the first impedance value is 1.5 pF, the second impedance value is 2.2 pF, and the fourth impedance value is 2.2 pF. A third graph 603 illustrates a radiation characteristic of the electronic device 101 when the first impedance value is 1.5 pF, the second impedance value is 2.7 pF, and the third impedance value is 2.7 pF. A fourth graph 604 illustrates a radiation characteristic of the electronic device 101 when the first impedance value is 1.5 pF, the second impedance value is 0.5 pF, and the fourth impedance value is 100 nH. A fifth graph 605 illustrates a radiation characteristic of the electronic device 101 when the first impedance value is 1.5 pF, the second impedance value is 1.5 pF, and the fourth impedance value is 100 nH. A sixth graph 606 illustrates a radiation characteristic of the electronic device 101 when the first impedance value is 1.5 pF, the second impedance value is 100 nH, and the sixth impedance value is 100 nH.

According to an embodiment, since an electromagnetic field (e.g., the electromagnetic field F of FIG. 4C) formed by an electromagnetic interaction among conductive portions (e.g., the conductive portions 410 of FIG. 3) of a first housing (e.g., the first housing 210 of FIG. 3), conductive portions (e.g., the conductive portions 420 of FIG. 3) of a second housing (e.g., the second housing 220 of FIG. 3), and slots (e.g., the first slot S1, the second slot S2, the third slot S3, and/or the fourth slot S4 of FIG. 3) may be formed on the first slot S1 and the fourth slot S4, a radiation characteristic of the electronic device 101 may be adjusted through second impedance matching circuitry (e.g., the second impedance matching circuitry 452 of FIG. 3) and fourth impedance matching circuitry (e.g., the fourth impedance matching circuitry 454 of FIG. 3). The at least one processor 120 may adjust a radiation characteristic of an antenna using an electromagnetic field formed on the first slot S1 and the fourth slot S4 by adjusting impedance values of the second conductive portion 412 and the fifth conductive portion 422 in the folded state. When the at least one processor 120 adjusts a second impedance value and a fourth impedance value, the radiation characteristic of the electronic device 101 in the folded state may be referred to as a first sweep graph G1.

A second sweep graph G2 of FIG. 6B illustrates a radiation characteristic of the electronic device 101 using an electromagnetic field formed at the first conductive portion 411 when the electronic device according to a comparative example having a structure in which conductive portions of the first housing 210 and conductive portions of the second housing 220 correspond to each other is in folded state. For example, the electronic device according to the comparative example may be disposed so that non-conductive portions (e.g., the first non-conductive portion 431, the second non-conductive portion 432, the third non-conductive portion 433, or the fourth non-conductive portion 434) included in the first housing and the second housing overlap each other. The first sweep graph G1 may have a higher gain than the second sweep graph G2 in a frequency band between about 0.65 GHz and about 1.0 GHz. Since the electronic device 101 according to an embodiment may communicate with an external electronic device using a third resonant point (e.g., the third resonant point 513 of FIG. 5) in the folded state, the electronic device 101 according to an embodiment may have improved wireless communication performance.

According to an embodiment, the at least one processor 120 may be configured to adjust a radiation characteristic of the electronic device 101 in the folded state through third impedance matching circuitry (e.g., the third impedance matching circuitry 454 of FIG. 3). The at least one processor 120 may electrically connect a switch SW in the third impedance matching circuitry 453 to a passive component having a third impedance value. The graphs of FIG. 6C illustrate a change in radiation characteristic of the electronic device 101 when a fourth conductive portion (e.g., the fourth conductive portion 421 of FIG. 3) is electrically connected to the passive component having the third impedance value.

Referring to FIG. 6C, a first graph 601 illustrates a radiation characteristic of the electronic device 101 when at least one aperture tuner 451*a* and the fourth conductive portion 421 in the third impedance matching circuitry 453 are electrically separated in a first state in which the first impedance value is 1.5 pF, the second impedance value is 1.5 pF, and the fourth impedance value is 1.5 pF. A second graph 620 indicates a radiation characteristic of the electronic device 101 when the third impedance value is 27 nH in the first state. A third graph 630 illustrates a radiation characteristic of the electronic device 101 when at least one aperture tuner 451*a* in the third impedance matching circuitry 453 and the fourth conductive portion 421 are electrically separated in a second state in which the first impedance value is 1.5 pF, the second impedance value is 2.2 pF, and the fourth impedance value is 2.2 pF. A fourth graph 640 illustrates a radiation characteristic of the electronic device 101 when the third impedance value is 27 nH in the second state. A fifth graph 650 illustrates a radiation characteristic of the electronic device 101 when at least one aperture tuner 451*a* in the third impedance matching circuitry 453 and the fourth conductive portion 421 are electrically separated in a third state in which the first impedance value is 1.5 pF, the second impedance value is 2.7 pF, and the fourth impedance value is 2.7 pF. A sixth graph 660 illustrates a radiation characteristic of the electronic device 101 when the third impedance value is 27 nH in the third state. A seventh graph 670 illustrates a radiation characteristic of the electronic device 101 when at least one aperture tuner 451*a* in the third impedance matching circuitry 453 and the fourth conductive portion 421 are electrically separated in a fourth state in which the first impedance value is 1.5 pF, the second impedance value is 1.0 pF, and the fourth impedance value is 100 nH. The eighth graph 680 illustrates a radiation characteristic of the electronic device 101 when the third impedance value is 27 nH in the fourth state.

According to an embodiment, since the fourth conductive portion 421 faces the first conductive portion 411 and the second conductive portion 412 in the folded state, the radiation characteristic of the electronic device 101 may be precisely adjusted through the third impedance matching circuitry 453 electrically connected to the fourth conductive portion 421. The at least one processor 120 may adjust the radiation characteristic of the electronic device 101 using an electromagnetic field formed on the first slot S1 and the fourth slot S4 by adjusting an impedance value of the fourth conductive portion 421 through the third impedance matching circuitry 453. When the at least one processor 120 controls the switch SW so that the fourth conductive portion 421 and a passive component having a third impedance value are connected, the radiation characteristic of the electronic device 101 in the folded state may be referred to as a first sweep graph G3 based on the third impedance value. A second sweep graph G4 of FIG. 6C illustrates a radiation characteristic of the electronic device 101 in the folded state when the fourth conductive portion 421 and at least one aperture tuner 451*a* in the third impedance matching circuitry 453 are electrically separated. Comparing the first sweep graph G3 and the second sweep graph G4, the electronic device 101 according to an embodiment may improve about 0.5 dB radiation efficiency by adjusting the fourth impedance value within a frequency range of about 600 MHz to about 700 MHz. The electronic device 101 according to an embodiment may have improved wireless communication performance as a transmission and/or reception gain of a wireless communication signal is improved.

Figure 7A:
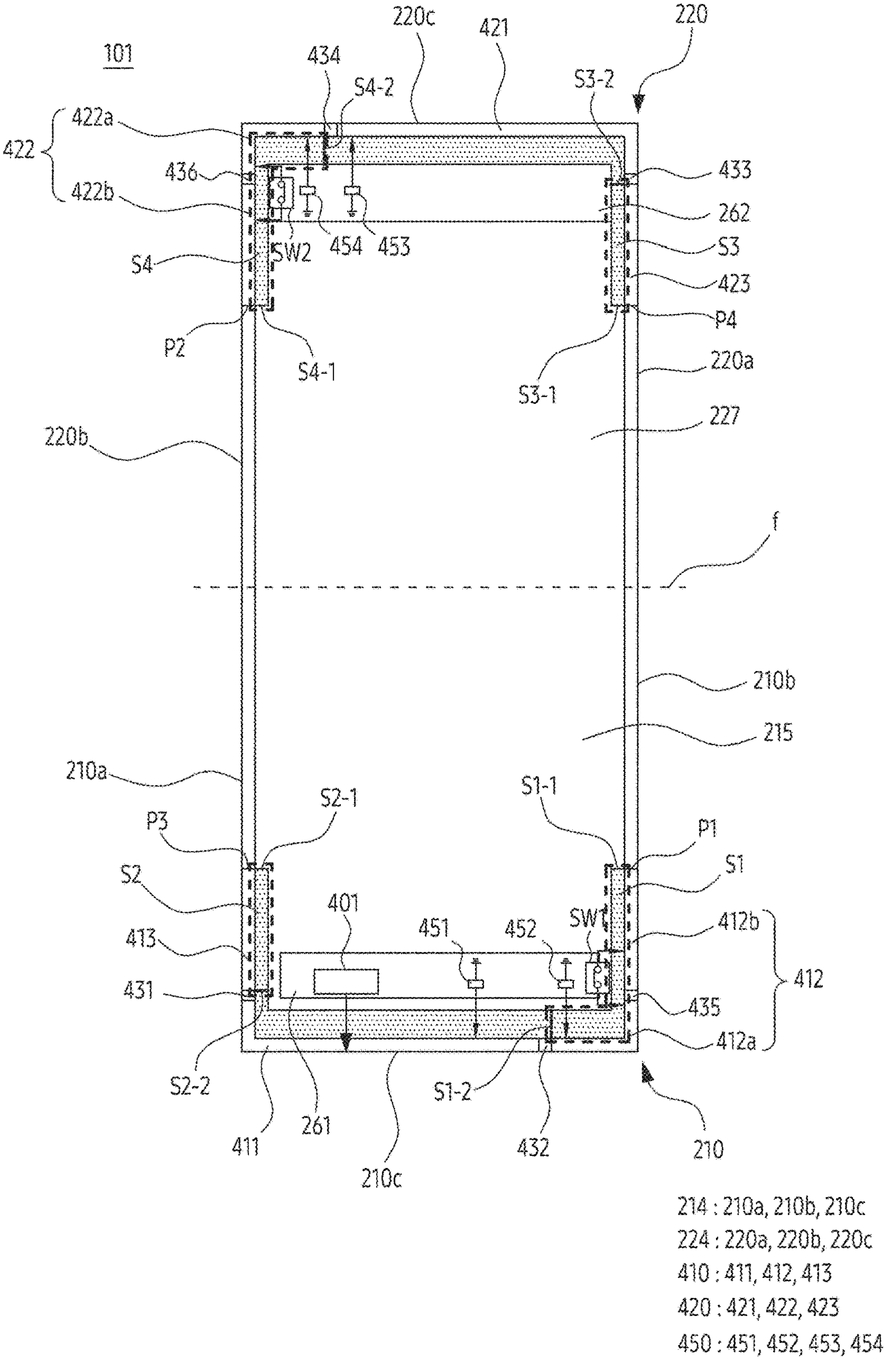
FIG. 7A schematically illustrates an electronic device according to an embodiment of the disclosure.

FIG. 7A schematically illustrates an electronic device according to an embodiment of the disclosure.

Figure 7B:
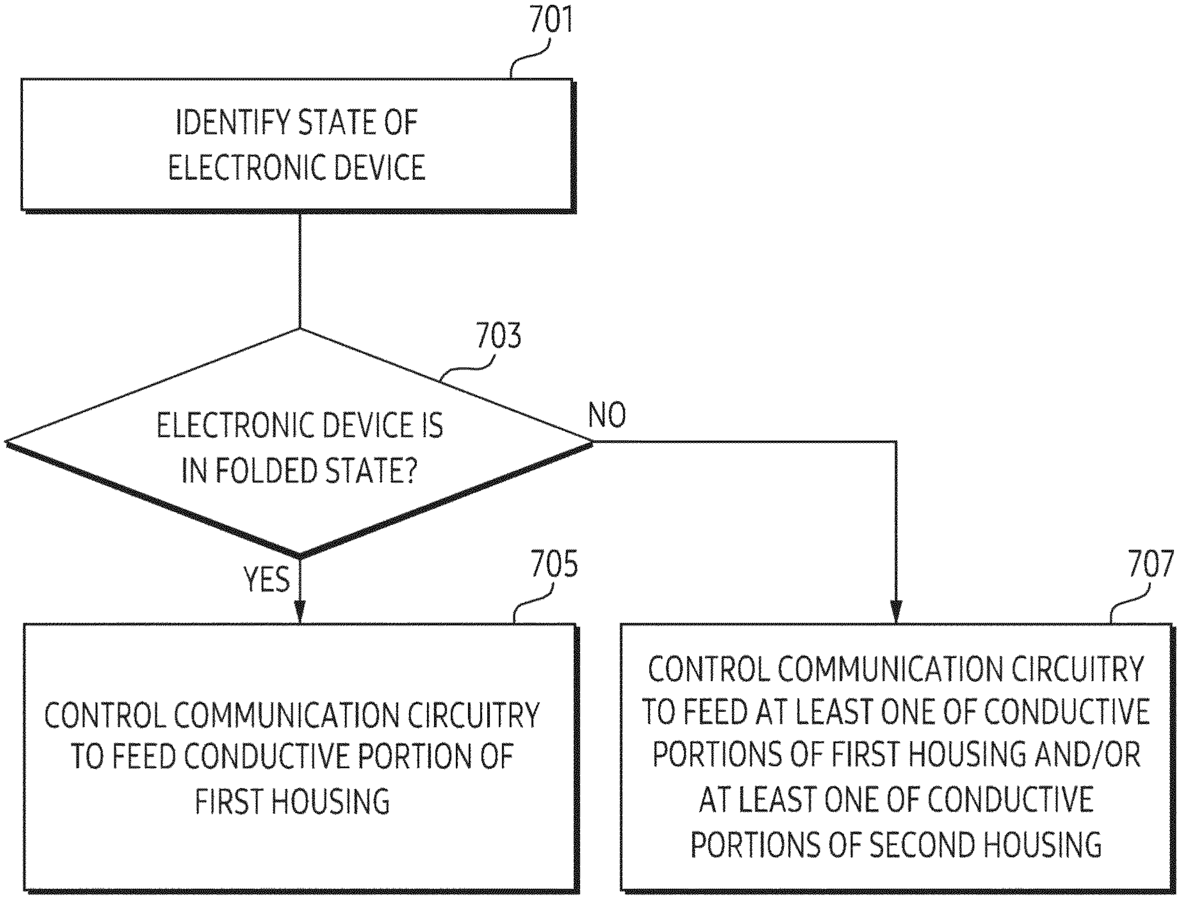
FIG. 7B is a flowchart illustrating an operation of at least one processor performed based on a state of an electronic device according to an embodiment of the disclosure.

FIG. 7B is a flowchart illustrating an operation of at least one processor performed based on a state of an electronic device according to an embodiment of the disclosure.

Referring to FIG. 7A, a first support member 215 may be spaced apart from a first conductive portion 411, a second conductive portion 412, and a third conductive portion 413. A second support member 227 may be spaced apart from a fourth conductive portion 421, a fifth conductive portion 422, and a sixth conductive portion 423. For example, the electronic device 101 may include a non-conductive member disposed between the first support member 215 and a first side member 214 and between the second support member 227 and a second side member 224. By including a non-conductive material (e.g., resin), the non-conductive member may electrically separate the first support member 215 and the first side member 214 and electrically separate the second support member 227 and the second side member 224.

The electronic device 101 according to an embodiment may include a first slot S1, a second slot S2, a third slot S3, and a fourth slot S4. For example, the first slot S1, the second slot S2, the third slot S4, and the fourth slot S4 may include a non-conductive material (e.g., resin).

The electronic device 101 according to an embodiment may include a fifth non-conductive portion 435 disposed at a second periphery 210*b* of the first housing 210 and a sixth non-conductive portion 436 disposed at a fifth periphery 220*b* of the second housing 220. According to an embodiment, the second conductive portion 412 may be separated into a seventh conductive portion 412*a* and an eighth conductive portion 412*b* by the fifth non-conductive portion 435. For example, the seventh conductive portion 412*a* may extend from the second non-conductive portion 432 in a third periphery 210*c* to the fifth non-conductive portion 435 in the second periphery 210*b*. The eighth conductive portion

412*b* may extend from the fifth non-conductive portion 435 in the second periphery 210*b* to a location P1 of the second periphery 210*b* along the second periphery 210*b*. According to an embodiment, the fifth conductive portion 422 may be separated into a ninth conductive portion 422*a* and a tenth conductive portion 422*b* by the sixth non-conductive portion 436. For example, the ninth conductive portion 422*a* may extend from the fourth non-conductive portion 434 in a sixth periphery 220*c* to the sixth non-conductive portion 436 in the fifth periphery 220*b*. The tenth conductive portion 422*b* may extend from the sixth non-conductive portion 436 in the fifth periphery 220*b* to a location P2 of the fifth periphery 220*b* along the fifth periphery 220*b*.

The electronic device 101 according to an embodiment may include a first switch SW1 and/or a second switch SW2. For example, the first switch SW1 may electrically connect the seventh conductive portion 412*a* and the eighth conductive portion 412*b*. For example, the second switch SW2 may electrically connect the ninth conductive portion 422*a* and the tenth conductive portion 422*b*. For example, the first switch SW1 and the second switch SW2 may be operably connected to the communication circuitry 401. For example, by controlling the first switch SW1, the communication circuitry 401 may electrically connect or electrically separate the seventh conductive portion 412*a* and the eighth conductive portion 412*b*. For example, by controlling the second switch SW2, the communication circuitry 401 may electrically connect or electrically separate the ninth conductive portion 422*a* and the tenth conductive portion 422*b*.

According to an embodiment, the communication circuitry 401 may variously implement a resonant frequency of an antenna through the first switch SW1 and the second switch SW2. According to an embodiment, the communication circuitry 401 may be configured to control the first switch SW1 and the second switch SW2, based on a resonant frequency of a signal to be transmitted to an external electronic device in the folded state. For example, when feeding the first conductive portion 411, the communication circuitry 401 may adjust an electrical length of an antenna including the second conductive portion 412 and/or an antenna including the fifth conductive portion 422, through the first switch SW1 and/or the second switch SW2. According to an embodiment, the communication circuitry 401 may adjust a resonant frequency of an antenna including the second conductive portion 412 and/or a resonant frequency of an antenna including the fifth conductive portion 422, by adjusting the electrical length of the antenna including the second conductive portion 412 and/or the antenna including the fifth conductive portion 422.

According to an embodiment, the communication circuitry 401 may be configured to, based on a state of the electronic device 101, feed a conductive portion (e.g., the first conductive portion 411) of the first housing 210, or feed at least one of the conductive portions 410 of the first housing 210 and/or at least one of the conductive portions 420 of the second housing 220. In the folded state, as the conductive portions 410 of the first housing 210 and the conductive portions 420 of the second housing 220 are located close to each other, an electromagnetic interaction may occur among the conductive portions 410 of the first housing 210, the conductive portions 420 of the second housing 220, and the slots S1, S2, S3, and S4. The electronic device 101 may be configured to communicate with an external electronic device using a third resonant point formed by the electromagnetic interaction in the folded state.

Referring to FIG. 7A, the electronic device 101 may include a sensor 461 for identifying the state of the electronic device 101. For example, the electronic device 101 may include a sensor 461 (e.g., a hall sensor) capable of identifying the magnitude and direction of a magnetic field and a magnet 462. The sensor 461 may be disposed in the first housing 210, and the magnet 462 may be disposed in the second housing 220. The number of sensors 461 and housings may be one or more. The communication circuitry 401 may be operably connected to the sensor 461. For example, through the sensor 461, the communication circuitry 401 may obtain data related to changes in the strength and direction of the magnetic field according to movement of the magnet 462 moving with the second housing 220. The communication circuitry 401 may identify a relative location of the second housing 220 with respect to the first housing 210, based on a change in the magnetic field formed by the magnet 462 disposed in the second housing 220.

According to an embodiment, in the unfolded state, the conductive portions 410 of the first housing 210 and/or the conductive portions 420 of the second housing 220 may operate as an antenna by being fed by the communication circuitry 401. Since the first housing 210 and the second housing 220 are disposed on substantially the same plane in the unfolded state, each of the conductive portions 410 of the first housing 210 and each of the conductive portions 420 of the second housing 220 may operate as an independent antenna radiator. Since each of the conductive portions 410 of the first housing 210 and the conductive portions 420 of the second housing 220 may have different lengths, they may have different radiation characteristics when operating as the antenna radiator. For example, the first conductive portion 411 and/or the fourth conductive portion 421 may operate as an antenna for a signal having a frequency within a low band. For example, the second conductive portion 412 and/or the fifth conductive portion 422 may operate as an antenna for a signal having a frequency within a mid-band (e.g., about 1 GHz to about 7 GHz) and/or a high band (e.g., about 24 GHz or more). For example, the third conductive portion 413 and/or the sixth conductive portion 423 may operate as an antenna for a signal having a frequency within an ultra-wide band (UWB). According to an embodiment, in the unfolded state, the conductive portions 410 of the first housing 210 and the conductive portions 420 of the second housing 220 may operate as an antenna for transmitting and/or receiving various signals.

According to an embodiment, the communication circuitry 401 may be configured to feed the first conductive portion 411 and/or the second conductive portion 412 based on a state of the electronic device 101. The operations of FIG. 7B indicate an operation of at least one processor 120 when the communication circuitry 401 transmits and/or receives a signal having a frequency within a low band.

Referring to FIG. 7B, in operation 701, at least one processor (e.g., the processor 120 of FIG. 1) may identify a state of an electronic device (e.g., the electronic device 101 of FIG. 7A). For example, at least one processor 120 may identify a relative location of a second housing (e.g., the second housing 220 of FIG. 7A) with respect to a first housing (e.g., the first housing 210 of FIG. 7A) through a sensor (e.g., the second housing 220 of FIG. 7A). For example, the sensor 461 may be configured to obtain data on the magnitude and/or direction of a magnetic field by a magnet (e.g., the magnet 462 of FIG. 7A) disposed in the second housing 220 and transmit the obtained data to the processor 120. The processor 120 may identify whether a state of the electronic device is in the folded state or the unfolded state based on the data.

In operation 703, at least one processor 120 may identify whether the electronic device 101 is in the folded state or the unfolded state. For example, the processor 120 may identify whether the electronic device 101 is in the folded state in operation 703. The processor 120 may compare the data obtained through the sensor 461 with reference data corresponding to the folded state and the unfolded state. For example, when the data is within a range of reference data corresponding to the folded state, the processor 120 may identify the state of the electronic device 101 as the folded state. The reference data corresponding to the folded state may be data indicating a state in which the first housing 210 and the second housing 220 are disposed to face each other. However, it is not limited thereto. For example, in operation 703, the processor 120 may identify whether the electronic device 101 is in the unfolded state. For example, when the data obtained through the sensor 461 is within a range of reference data corresponding to the unfolded state, the processor 120 may identify that the state of the electronic device 101 is in the unfolded state. The reference data corresponding to the unfolded state may be data indicating a state in which the first housing 210 and the second housing 220 are disposed on substantially the same plane.

In operation 705, at least one processor 120 may control the communication circuitry 401 to feed a conductive portion (e.g., the first conductive portion 411) of the first housing 210, based on the folded state of the electronic device 101. Since the folded state is a state in which the first housing 210 and the second housing 220 face each other, a distance between the sensor 461 and the magnet 462 may be the closest. In the folded state, the magnitude of a magnetic field of the magnet 462 obtained through the sensor 461 may be within a first range. The at least one processor 120 may identify that the electronic device 101 is in the folded state, based on identifying that the magnitude of the magnetic field of the magnet 462 indicated by the data obtained through the sensor 461 is included within the first range. For example, in the folded state, the communication circuitry 401 may feed the first conductive portion 411. When the communication circuitry 401 feeds the first conductive portion 411, a third resonant point (e.g., the third resonant point 513 of FIG. 5) may be formed by an electromagnetic field (e.g., the electromagnetic field F of FIG. 4A) formed on the first slot S1 and the fourth slot S4. The communication circuitry 401 may transmit a signal having a frequency within a low band to an external electronic device or receive a signal having a frequency within the low band from an external electronic device, by using the third resonant point.

According to an embodiment, in the folded state, the communication circuitry 401 may feed the first conductive portion 411. In the folded state, when the communication circuitry 401 feeds the first conductive portion 411, the communication circuitry 401 may be configured to communicate with an external electronic device using an electromagnetic field (e.g., the electromagnetic field F of FIG. 4A) excited to the first slot S1 and the fourth slot S4. Due to the electromagnetic field formed on the first slot S1 and the fourth slot S4, the first conductive portion 411, the second conductive portion 412, and the fifth conductive portion 422 may operate as an antenna capable of transmitting and/or receiving a signal within a designated frequency band. In the unfolded state, the at least one processor 120 may adjust a resonant frequency of the antenna within a designated frequency band, through the first impedance matching circuitry 451 electrically connected to the first conductive portion 411. In the folded state, the at least one processor 120 may tune the resonant frequency of the antenna through the second impedance matching circuitry 452 and/or the fourth impedance matching circuitry 454. In the folded state, tuning of the resonant frequency of the antenna by the second impedance matching circuitry 452 and the fourth impedance matching circuitry 454 may be referred to as the description described with reference to FIG. 6B. In the folded state, the at least one processor 120 may precisely adjust the resonant frequency of the antenna through the third impedance matching circuitry 453. In the folded state, tuning of the resonant frequency of the antenna by the third impedance matching circuitry 453 may be referred to as the description described with reference to FIG. 6C. In the folded state, through an antenna including the first conductive portion 411 and/or an antenna including the fourth conductive portion 421, the communication circuitry 401 may transmit a signal having a frequency in the low band to an external electronic device, or receive a signal having a frequency in the low band from an external electronic device.

In operation 707, the at least one processor 120 may control the communication circuitry 401 to feed at least one (e.g., the first conductive portion 411) of the conductive portions 410 of the first housing 210 and/or at least one (e.g., the fourth conductive portion 421) of the conductive portions 420 of the second housing 220, based on the unfolded state of the electronic device 101. In the unfolded state, since the first housing 210 and the second housing 220 are disposed on substantially the same plane, a distance between the sensor 461 and the magnet 462 may be the farthest. In the unfolded state, the magnitude of the magnetic field of the magnet 462 obtained through the sensor 461 may be within a second range smaller than the first range. The at least one processor 120 may identify that the electronic device 101 is in the unfolded state, based on identifying that the magnitude of the magnetic field of the magnet 462 indicated by the data obtained through the sensor 461 is included within the second range. For example, in the unfolded state, the communication circuitry 401 may feed the first conductive portion 411 and/or the fourth conductive portion 421. When the communication circuitry 401 feeds the first conductive portion 411 and/or the fourth conductive portion 421, the first conductive portion 411 and/or the fourth conductive portion 421 may operate as an antenna radiator. In the unfolded state, the communication circuitry 401 may communicate with an external electronic device through an antenna including the first conductive portion 411 and/or an antenna including the fourth conductive portion 421. For example, in the unfolded state, the at least one processor 120 may adjust a resonant frequency of an antenna including the first conductive portion 411, through the first impedance matching circuitry 451 electrically connected to the first conductive portion 411. For example, in the unfolded state, the at least one processor 120 may adjust a resonant frequency of an antenna including the fourth conductive portion 421, through the third impedance matching circuitry 453 electrically connected to the fourth conductive portion 421. For example, the fourth conductive portion 421 may be used as an antenna radiator for transmitting and/or receiving a signal with a frequency within the low band. For example, the fourth conductive portion 421 may be used as an antenna radiator for a transmission diversity (Drx: diversity Rx).

Figure 8:
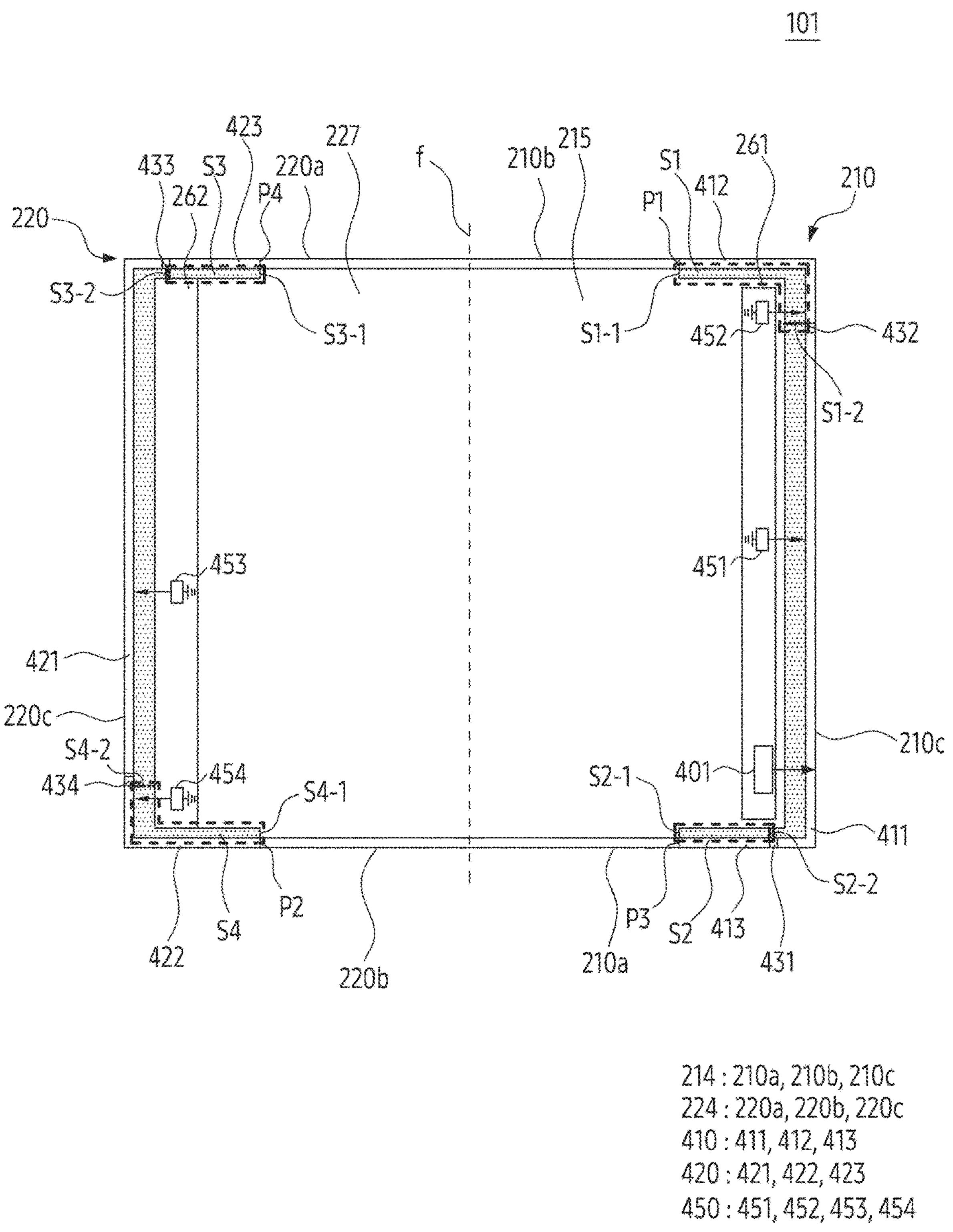
FIG. 8 schematically illustrates an electronic device according to an embodiment of the disclosure.

FIG. 8 schematically illustrates an electronic device according to an embodiment of the disclosure.

The above descriptions are described based on the structure of the electronic device 101 shown in FIG. 3 in order to use the third resonant point, but are not limited thereto. For example, as illustrated in FIG. 3, the electronic device 101 may have peripheries (e.g., the first periphery 210_a_, the second periphery 210_b_, the fourth periphery 220_a_, and the fifth periphery 220_b_ of FIG. 3) perpendicular to a folding axis f longer than peripheries (e.g., the third periphery 210_c_ and the sixth periphery 220_c_ of FIG. 3) parallel to the folding axis f, but are not limited thereto. For example, referring to FIG. 8, in the unfolded state, the peripheries may be substantially the same or similar. Accordingly, redundant descriptions may be omitted.

The descriptions described with reference to FIGS. 3, 4A to 4C, 5, 6A to 6C, 7A, and 7B may be applied substantially identically to the electronic device 101 illustrated in FIG. 8. According to an embodiment, the electronic device 101 may include non-conductive portions that do not overlap each other and are spaced apart from each other in the folded state. For example, the first housing 210 may include a first non-conductive portion 431 and a second non-conductive portion 432. The second housing 220 may include a third non-conductive portion 433 and a fourth non-conductive portion 434. In the folded state, the first non-conductive portion 431 may be disposed to overlap the fifth conductive portion 422. In the folded state, the second non-conductive portion 432 may be disposed to overlap the fourth conductive portion 421. In the folded state, the third non-conductive portion 433 may be disposed to overlap the second conductive portion 412. In the folded state, the fourth non-conductive portion 434 may be disposed to overlap the first conductive portion 411.

According to an embodiment, the electronic device 101 may include a first slot S1 between the second conductive portion 412 and the first support member 215, a second slot S2 between the third conductive portion 413 and the first support member 215, a third slot S3 between the sixth conductive portion 423 and the second support member 227, and a fourth slot S4 between the fifth conductive portion 422 and the second support member 227. In the unfolded state, the communication circuitry 401 may be configured to feed the first conductive portion 411. As the first conductive portion 411 is fed, an electromagnetic field may be formed in the first conductive portion 411. The electromagnetic field formed at the first conductive portion 411 may be excited to the first slot S1 and the fourth slot S4. The electronic device 101 may communicate with an external electronic device using a third resonant point by the electromagnetic field excited to the first slot S1 and the fourth slot S4. When the electronic device 101 communicates with an external electronic device using the third resonant point, wireless communication performance of the electronic device 101 may be improved.

An electronic device (e.g., the electronic device 101 of FIG. 3) according to an embodiment may include a first housing (e.g., the first housing 210 of FIG. 3), a second housing (e.g., the second housing 220 of FIG. 3), and communication circuitry (e.g., the communication circuitry 401 of FIG. 3). The first housing 210 may include a first periphery (e.g., the first periphery 210_a_ of FIG. 3), a second periphery (e.g., the second periphery 210_b_ of FIG. 3), and a third periphery (e.g., the third periphery 210_c_ of FIG. 3). The first periphery 210_a_ may be perpendicular to a folding axis f. The first periphery 210_a_ may include a first non-conductive portion (e.g., the first non-conductive portion 431 of FIG. 3). The second periphery 210_b_ may be opposite to the first periphery 210_a_. The third periphery 210_c_ may be parallel to the folding axis f. The third periphery 210_c_ may include a second non-conductive portion (e.g., the second non-conductive portion 432 of FIG. 3). The third periphery 210_c_ may be disposed between the first periphery 210_a_ and the second periphery 210_b_. For example, the first periphery 210_a_ may extend from the folding axis f, and the second periphery 210_b_ may extend from the folding axis f. For example, the third periphery 210_c_ may be spaced apart from the folding axis f. The second housing 220 may include a fourth periphery (e.g., the fourth periphery 220_a_ of FIG. 3), a fifth periphery (e.g., the fifth periphery 220_b_ of FIG. 3), and a sixth periphery (e.g., the sixth periphery 220_c_ of FIG. 3). The fourth periphery 220_a_ may be perpendicular to the folding axis f. The fourth periphery 220_a_ may include a third non-conductive portion (e.g., the third non-conductive portion 433 of FIG. 3). The fifth periphery 220_b_ may be opposite to the fourth periphery 220_a_. The sixth periphery 220_c_ may be parallel to the folding axis f. The sixth periphery 220_c_ may include a fourth non-conductive portion (e.g., the fourth non-conductive portion 434 of FIG. 3). The sixth periphery 220_c_ may be disposed between the fourth periphery 220_a_ and the fifth periphery 220_b_. For example, the fourth periphery 220_a_ may extend from the folding axis f, and the fifth periphery 220_b_ may extend from the folding axis f. The communication circuitry (e.g., the communication circuitry 401 of FIG. 3) may be disposed in at least one of the first housing 210 or the second housing 220. The first housing 210 and second housing 220 may be rotatably connected with respect to the folding axis f. In a folded state of the electronic device in which the third periphery 210_c_ and the sixth periphery 220_c_ face each other, the first periphery 210_a_ may face the fifth periphery 220_b_. In the folded state, the second periphery 210_b_ may face the fourth periphery 220_a_. For example, in a folded state of the electronic device 101 in which the third periphery 210_c_ and the sixth periphery 220_c_ are adjacent to each other, the first periphery 210_a_ may be adjacent to the fifth periphery 220_b_. In the folded state, the second periphery 210_b_ may be adjacent to the fourth periphery 220_a_. The first housing 210 may include a first conductive portion (e.g., the first conductive portion 411 of FIG. 3), a second conductive portion (e.g., the second conductive portion 412 of FIG. 3), and a first slot (e.g., the first slot S1 of FIG. 3). The first conductive portion 411 may extend from the first non-conductive portion 431 to the second non-conductive portion 432. The second conductive portion 412 may extend from the second non-conductive portion 432 to a location P1 on the second periphery 210_b_. The first slot S1 may be disposed between the second conductive portion 412 and a first support member 215 disposed in the first housing 210. The second housing 220 may include a third conductive portion (e.g., the fifth conductive portion 422 of FIG. 3) and a second slot (e.g., the fourth slot S4 of FIG. 3). The third conductive portion (e.g., the fifth conductive portion 422 of FIG. 3) may extend from the fourth non-conductive portion 434 to a location P2 on the fifth periphery 220_b_. The second slot S2 may be disposed between the third conductive portion (e.g., the fifth conductive portion 422 of FIG. 3) and a second support member 227 disposed in the second housing 220. The communication circuitry 401 may be configured to communicate with an external electronic device using an electromagnetic field formed at the first slot S1 and the second slot (e.g., the fourth slot S4 of FIG. 3), based on feeding the first conductive portion 411 in the folded state. According to an embodiment of the disclosure, conductive portions of the first housing, conductive portions of the second housing, and the slots may be disposed to electromagnetically interact with each other when the communication circuitry feeds the first conductive portion in the folded state. In the folded state, the electronic device may communicate with an external electronic device using an electromagnetic field formed on the first slot and the second slot. Since the electromagnetic field may form resonance (e.g., a third resonant point) by coupling, wireless communication performance of the electronic device may be improved. According to an embodiment, since the conductive portions of the first housing and the conductive portions of the second housing do not need to have a structure symmetrical to each other, configuration and design of the electronic device may be simplified.

According to an embodiment, the first housing 210 may include a fourth conductive portion (e.g., the third conductive portion 413 of FIG. 3). The fourth conductive portion (e.g., the third conductive portion 413 of FIG. 3) may extend along the first periphery 210*a* from the first non-conductive portion 431 toward the folding axis f. The second housing 220 may include a fifth conductive portion (e.g., the fourth conductive portion 421 of FIG. 3) and a sixth conductive portion (e.g., the sixth conductive portion 423 of FIG. 3). The fifth conductive portion (e.g., the fourth conductive portion 421 of FIG. 3) may extend from the third non-conductive portion 433 to the fourth non-conductive portion 434. The sixth conductive portion 423 may extend along the fourth periphery 220*a* from the third non-conductive portion 433 toward the folding axis f. According to an embodiment of the disclosure, the first housing and the second housing may include a plurality of conductive portions and a plurality of non-conductive portions disposed between the plurality of conductive portions. In the unfolded state, the electronic device may use at least one of the plurality of conductive portions as an antenna radiator. The communication circuitry may use an electromagnetic field formed at the first slot and the second slot by a segmentation structure formed by the plurality of conductive portions and the plurality of non-conductive portions.

According to an embodiment, in the folded state, when the electronic device 101 is viewed from above in a direction from the first housing 210 toward the second housing 220, the first non-conductive portion 431 may be located to overlap the third conductive portion (e.g., the fifth conductive portion 422 of FIG. 3). In the folded state, when the electronic device 101 is viewed from above in the direction from the first housing 210 toward the second housing 220, the second non-conductive portion 432 may be located to overlap the fifth conductive portion (e.g., the fourth conductive portion 421 of FIG. 3).

According to an embodiment, in the folded state, when the electronic device 101 is viewed from above in a direction from the second housing 220 toward the first housing 210, the third non-conductive portion 433 may be located to overlap the second conductive portion 412. In the folded state, when the electronic device 101 is viewed from above in the direction from the second housing 220 toward the first housing 210, the fourth non-conductive portion 434 may be positioned to overlap the first conductive portion 411. According to an embodiment of the disclosure, a segmental structure of the first housing and a segmental structure of the second housing may form an electromagnetic field in the first slot and the second slot. In the folded state, the electronic device may, by using the electromagnetic field, receive a signal from an external electronic device or transmit a signal to an external electronic device. As the slots and the electromagnetic field are used, radiation performance (e.g., gain) of the electronic device may be improved.

According to an embodiment, the first housing 210 may include a third slot (e.g., the second slot S2 of FIG. 3). The third slot (e.g., the second slot S2 of FIG. 3) may be disposed between the fourth conductive portion (e.g., the third conductive portion 413 of FIG. 3) and the first support member 215. The second housing 220 may include a fourth slot (e.g., the third slot S3 of FIG. 3). The fourth slot (e.g., the third slot S3 of FIG. 3) may be disposed between the sixth conductive portion 423 and the second support member 227. According to an embodiment of the disclosure, slots of an electronic device may form a slot antenna with the conductive portions of the first housing and the conductive portions of the second housing. The electronic device may be configured to communicate with an external electronic device using the slot antenna.

According to an embodiment, the first conductive portion 411, the second conductive portion 412, and the third conductive portion (e.g., the fifth conductive portion 422 of FIG. 3) may operate as at least a portion of an antenna when the communication circuitry 401 feeds the first conductive portion 411 in the folded state. According to an embodiment of the disclosure, in the folded state, the first conductive portion, the second conductive portion, and the third conductive portion may operate as an antenna radiator using an electromagnetic field formed at the first slot and the second slot.

According to an embodiment, the first slot S1, the second slot S2, the third slot S3, and the fourth slot S4 may include a non-conductive material (e.g., resin). The length of the slots may have a length based on a wavelength according to permittivity of the non-conductive material and a frequency of a signal, but is not limited thereto.

According to an embodiment, in an unfolded state different from the folded state, the communication circuitry 401 may be configured to transmit a signal to an external electronic device, based on feeding at least one of the first conductive portion 411, the second conductive portion 412, the third conductive portion (e.g., the fifth conductive portion 422 of FIG. 3), and the fifth conductive portion (e.g., the fourth conductive portion 421 of FIG. 3). According to an embodiment of the disclosure, in the unfolded state, the electronic device may use the first conductive portion, the second conductive portion, the third conductive portion, and/or the fifth conductive portion as an antenna. According to an embodiment, various antenna combinations may be possible.

According to an embodiment, the first housing 210 may include a fifth non-conductive portion (e.g., the fifth non-conductive portion of FIG. 7A). The fifth non-conductive portion 435 may be disposed at the second periphery 210*b*. The fifth non-conductive portion 435 may separate the second conductive portion 412 into a seventh conductive portion (e.g., the seventh conductive portion 412*a* of FIG. 7A) and an eighth conductive portion (e.g., the eighth conductive portion 412*b* of FIG. 7A). The second housing 220 may include a sixth non-conductive portion (e.g., the sixth non-conductive portion 436 of FIG. 7A). The sixth non-conductive portion 436 may be disposed at the fifth periphery 220*b*, and may separate the third conductive portion (e.g., the fifth conductive portion 422 of FIG. 3) into a ninth conductive portion 422*a* and a tenth conductive portion 422*b*.

The electronic device 101 according to an embodiment may further include a first switch (e.g., the first switch SW1 of FIG. 7A), a second switch (e.g., the second switch SW2 of FIG. 7A), and at least one processor (e.g., the at least one processor 120 of FIG. 6A). The first switch SW1 may electrically connect the seventh conductive portion 412*a* and the eighth conductive portion 412*b*. The second switch SW2 may electrically connect the ninth conductive portion 422*a* and the tenth conductive portion 422*b*. In the folded state, in order to adjust an electrical length of an antenna including the first conductive portion 411, the second conductive portion 412, and the third conductive portion (e.g., the fifth conductive portion 422 of FIG. 3), the at least one processor 120 may be configured to control a first switch SW1 or a second switch SW2. According to an embodiment of the disclosure, the electronic device may transmit and/or receive various signals. Since a radiation characteristic (e.g., resonant frequency) varies according to a length of the antenna radiator, the electronic device may include an antenna capable of transmitting and/or receiving various signals through a plurality of conductive portions. For example, in the folded state, at least one processor may control the first switch and the second switch to adjust the electrical length of the antenna radiator. As the electrical length of the antenna radiator is adjusted, the radiation characteristic of the antenna may be adjusted.

The electronic device 101 according to an embodiment may further include first impedance matching circuitry (e.g., the first impedance matching circuitry 451 of FIG. 3) and at least one processor 120. The first impedance matching circuitry 451 may be electrically connected to the first conductive portion 411. In the folded state, the at least one processor 120 may be configured to adjust a resonant frequency of an antenna including the first conductive portion 411, the second conductive portion 412, and the third conductive portion (e.g., the fifth conductive portion 422 of FIG. 3) within a designated frequency band, through the first impedance matching circuitry 451. According to an embodiment of the disclosure, in the folded state, the communication circuitry may feed the first conductive portion. The first impedance matching circuitry electrically connected to the first conductive portion may adjust a resonant frequency band of an antenna including the first conductive portion. The at least one processor may control the first impedance matching circuitry so that the resonant frequency of the antenna including the first conductive portion is included within a designated frequency band.

The electronic device 101 according to an embodiment may further include second impedance matching circuitry (e.g., the second impedance matching circuitry 452 of FIG. 3), third impedance matching circuitry (e.g., the fourth impedance matching circuitry 454 of FIG. 3), and at least one processor 120. The second impedance matching circuitry (e.g., the second impedance matching circuitry 452 of FIG. 3) may be electrically connected to the second conductive portion 412. The third impedance matching circuitry 454 may be electrically connected to the third conductive portion (e.g., the fifth conductive portion 422 of FIG. 3). In the folded state, the at least one processor 120 may be configured to adjust a resonant frequency of an antenna including the first conductive portion 411, the second conductive portion 412, and the third conductive portion (e.g., the fifth conductive portion 422 of FIG. 3), through the second impedance matching circuitry (e.g., the second impedance matching circuitry 452 of FIG. 3) and the third impedance matching circuitry 454. According to an embodiment of the disclosure, when the communication circuitry feeds the first conductive portion in the folded state, the first conductive portion, the second conductive portion, and the third conductive portion may operate as an antenna radiator. The antenna including the first conductive portion, the second conductive portion, and the third conductive portion may transmit and/or receive a signal with an external electronic device using an electromagnetic field formed at the first slot and the second slot. Since the second impedance matching circuitry may be electrically connected to the second conductive portion and the third impedance matching circuitry may be electrically connected to the third conductive portion, at least one processor may control the second impedance matching circuitry and the third impedance matching circuitry to adjust the resonant frequency of the antenna. According to an embodiment, a third resonant point may be swept by the second impedance matching circuitry and the third impedance matching circuitry.

The electronic device 101 according to an embodiment may further include fourth impedance matching circuitry (e.g., the third impedance matching circuitry 453 of FIG. 3) and at least one processor 120. The fourth impedance matching circuitry (e.g., the third impedance matching circuitry 453 of FIG. 3) may be electrically connected to the fifth conductive portion (e.g., the fourth conductive portion 421 of FIG. 3). The at least one processor 120 may be configured to adjust a resonant frequency of an antenna including the first conductive portion 411, the second conductive portion 412, and the third conductive portion (e.g., the fifth conductive portion 422 of FIG. 3), through the fourth impedance matching circuitry (e.g., the third impedance matching circuitry 453 of FIG. 3), in the folded state. According to an embodiment of the disclosure, the fourth impedance matching circuitry electrically connected to the fifth conductive portion may adjust impedance of the fifth conductive portion. In the unfolded state, the fifth conductive portion may operate as an antenna radiator. In the unfolded state, the fourth impedance matching circuitry may be used to adjust a resonant frequency of an antenna including the fifth conductive portion. Since the fifth conductive portion may at least partially face the first conductive portion in the folded state, at least one processor may finely adjust a resonant frequency of an antenna including the first conductive portion, the second conductive portion, and the third conductive portion, through the fourth impedance matching circuitry.

The electronic device according to an embodiment may further include a sensor (e.g., the sensor 461 of FIG. 7A) and the at least one processor 120. The sensor 461 may be used to identify the folded state or an unfolded state different from the folded state. The at least one processor 120 may be configured to control the communication circuitry 401 to feed the first conductive portion 411, based on identifying the unfolded state through data obtained from the sensor 461. The at least one processor 120 may be configured to control the communication circuitry 401 to feed the first conductive portion 411 or the fifth conductive portion (e.g., the fourth conductive portion 421 of FIG. 3), based on identifying the folded state through the sensor 461. According to an embodiment of the disclosure, the electronic device may adjust a feeding location based on a state of the electronic device. Since an electromagnetic interaction may occur between conductive portions of the first housing and conductive portions of the second housing in the folded state, the communication circuitry may feed the conductive portion (e.g., the first conductive portion) of the first housing. Since the electromagnetic interaction between the conductive portions of the first housing and the conductive portions of the second housing is reduced in the unfolded state, the electronic device may communicate with an external electronic device by feeding at least one (e.g., the first conductive portion) of the conductive portions of the first housing and/or at least one (e.g., the third conductive portion) of the conductive portions of the second housing. In the unfolded state, the at least one processor may be configured to communicate with an external electronic device through an optimal antenna.

The electronic device 101 according to an embodiment may further include a hinge structure (e.g., the hinge structure 250 of FIG. 2C). The hinge structure 250 may rotatably connect the first housing 210 and the second housing 220 with respect to the folding axis so as to enable the electronic device 101 to be switched to the folded state or an unfolded state of the electronic device different from the folded state.

The electronic device 101 according to an embodiment may include a first housing (e.g., the first housing 210 of FIG. 3), a second housing (e.g., the second housing 220 of FIG. 3), and communication circuitry (e.g., the communication circuitry 401 of FIG. 3). The first housing 210 may include a first periphery (e.g., the first periphery 210*a* of FIG. 3), a second periphery (e.g., the second periphery 210*b* of FIG. 3), and a third periphery (e.g., the third periphery 210*c* of FIG. 3). The first periphery 210*a* may extend from a folding axis f. The first periphery 210*a* may include a first non-conductive portion (e.g., the first non-conductive portion 431 of FIG. 3). The second periphery 210*b* may extend from a folding axis f. The second periphery 210*b* may be opposite to the first periphery 210*a*. The third periphery 210*c* may be spaced apart from the folding axis f. The third periphery 210*c* may include a second non-conductive portion (e.g., the second non-conductive portion 432 of FIG. 3). The third periphery 210*c* may be disposed between the first periphery 210*a* and the second periphery 210*b*. The second housing 220 may include a fourth periphery (e.g., the fourth periphery 220*a* of FIG. 3), a fifth periphery (e.g., a fifth periphery 220*b* of FIG. 3), and a sixth periphery (e.g., the sixth periphery 220*c* of FIG. 3). The fourth periphery 220*a* may extend from the folding axis f. The fourth periphery 220*a* may include a third non-conductive portion (e.g., the third non-conductive portion 433 of FIG. 3). The fifth periphery 220*b* may extend from the folding axis f. The fifth periphery 220*b* may be opposite to the fourth periphery 220*a*. The sixth periphery 220*c* may be spaced apart from the folding axis f. The sixth periphery 220*c* may include a fourth non-conductive portion (e.g., the fourth non-conductive portion 434 of FIG. 3). The sixth periphery 220*c* may be disposed between the fourth periphery 220*a* and the fifth periphery 220*b*. The communication circuitry 401 may be disposed in at least one of the first housing 210 or the second housing 220. The first housing 210 and the second housing 220 may be rotatably connected with respect to the folding axis f. In the folded state, when the electronic device 101 is viewed from above in a direction from the second housing 220 toward the first housing 210, the fourth non-conductive portion 434 may be disposed to overlap the first conductive portion 411 extending from the first non-conductive portion 431 to the second non-conductive portion 432. In the folded state, when the electronic device 101 is viewed from above in the direction from the second housing 220 toward the first housing 210, the third non-conductive portion 433 may be disposed to overlap the second conductive portion 412 extending from the second non-conductive portion 432 to a location P1 on the second periphery 210*b*. According to an embodiment of the disclosure, the communication circuitry may be configured to communicate with an external electronic device using an electromagnetic field formed through segmentation structures of the first housing and the second housing. The segmentation structures of the first housing and the second housing may be configured to form an electromagnetic field by an electromagnetic interaction by having a structure different from a structure symmetrical to each other, in the folded state. In the folded state, when the communication circuitry uses the electromagnetic field, wireless communication performance may be improved.

According to an embodiment, the first housing 210 may include a first slot (e.g., the first slot S1 of FIG. 3). The first slot S1 may be disposed between the second conductive portion 412 and the first support member 215 disposed in the first housing 210. The second housing 220 may include a third conductive portion (e.g., the fifth conductive portion 422 of FIG. 3) and a second slot (e.g., the fourth slot S4 of FIG. 3). The third conductive portion (e.g., the fifth conductive portion 422 of FIG. 3) may extend from the fourth non-conductive portion 434 to a location P2 of the fifth periphery 220*b*. The second slot S2 may be disposed between the third conductive portion (e.g., the fifth conductive portion 422 of FIG. 3) and the second support member 227 disposed in the second housing 220. In the folded state, the communication circuitry 401 may be configured to communicate with an external electronic device using an electromagnetic field formed at the first slot S1 and the second slot (e.g., the fourth slot S4 of FIG. 3), based on feeding the first conductive portion 411. According to an embodiment of the disclosure, in the folded state, the electronic device may communicate with an external electronic device using an electromagnetic field formed on the first slot and the second slot. Since the electromagnetic field may form resonance (e.g., the third resonant point) by coupling, wireless communication performance of the electronic device may be improved.

According to an embodiment, the first housing 210 may include a fourth conductive portion (e.g., the third conductive portion 413 of FIG. 3). The fourth conductive portion (e.g., the third conductive portion 413 of FIG. 3) may extend along the first periphery 210*a* from the first non-conductive portion 431 toward the folding axis f. The second housing 220 may include a fifth conductive portion (e.g., the fourth conductive portion 421 of FIG. 3) and a sixth conductive portion (e.g., the sixth conductive portion 423 of FIG. 3). The fifth conductive portion (e.g., the fourth conductive portion 421 of FIG. 3) may extend from the third non-conductive portion 433 to the fourth non-conductive portion 434. The sixth conductive portion 423 may extend along the fourth periphery 220*a* from the third non-conductive portion 433 toward the folding axis f. According to an embodiment of the disclosure, the first housing and the second housing may include a plurality of conductive portions and a plurality of non-conductive portions disposed between the plurality of conductive portions. In the unfolded state, the electronic device may use at least one of the plurality of conductive portions as an antenna radiator. The communication circuitry may use an electromagnetic field formed at the first slot and the second slot by a segmentation structure formed by the plurality of conductive portions and the plurality of non-conductive portions.

According to an embodiment, in the folded state, when the communication circuitry 401 feeds the first conductive portion 411, the first conductive portion 411, the second conductive portion 412, and the third conductive portion (e.g., the fifth conductive portion 422 of FIG. 3) may operate as at least a portion of an antenna. According to an embodiment of the disclosure, in the folded state, the first conductive portion, the second conductive portion, and the third conductive portion may operate as an antenna radiator using an electromagnetic field formed at the first slot and the second slot.

The electronic device 101 according to an embodiment may further include first impedance matching circuitry (e.g., the second impedance matching circuitry 452 of FIG. 3), second impedance matching circuitry (e.g., the fourth impedance matching circuitry 454 of FIG. 3), and at least one processor 120. The first impedance matching circuitry (e.g., the second impedance matching circuitry 452 of FIG. 3) may be electrically connected to the second conductive portion 412. The second impedance matching circuitry (e.g., the fourth impedance matching circuitry 454 of FIG. 3) may be electrically connected to the fifth conductive portion 422. In the folded state, the at least one processor 120 may be configured to adjust a resonant frequency of an antenna including the first conductive portion 411, the second conductive portion 412, and the third conductive portion (e.g., the fifth conductive portion 422 of FIG. 3) through the first impedance matching circuitry (e.g., the second impedance matching circuitry 452 of FIG. 3) and the second impedance matching circuitry (e.g., the fourth impedance matching circuitry 454 of FIG. 3). According to an embodiment of the disclosure, in the folded state, when the communication circuitry feeds the first conductive portion, the first conductive portion, the second conductive portion, and the third conductive portion may operate as an antenna radiator. An antenna including the first conductive portion, the second conductive portion, and the third conductive portion may transmit and/or receive a signal with an external electronic device using an electromagnetic field formed at the first slot and the second slot. Since the first impedance matching circuitry may be electrically connected to the second conductive portion and the second impedance matching circuitry may be electrically connected to the third conductive portion, at least one processor may control the first impedance matching circuitry and the second impedance matching circuitry to adjust the resonant frequency of the antenna. According to an embodiment, a third resonant point may be swept by the first impedance matching circuitry and the second impedance matching circuitry.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first housing including:
a first periphery perpendicular to a folding axis, including a first non-conductive portion,
a second periphery opposite the first periphery, and
a third periphery between the first periphery and the second periphery, parallel to the folding axis, and including a second non-conductive portion;
a second housing, configured to rotatably connected to the first housing with respect to the folding axis, the second housing including:
a fourth periphery, perpendicular to a folding axis, including a third non-conductive portion,
a fifth periphery opposite the fourth periphery, and
a sixth periphery between the fourth periphery and the fifth periphery, parallel to the folding axis, including a fourth non-conductive portion; and
communication circuitry,
wherein, in a folded state of the electronic device in which the third periphery and the sixth periphery face each other, the first periphery faces the fifth periphery, and the second periphery faces the fourth periphery,
wherein the first housing includes:
a first conductive portion extending from the first non-conductive portion to the second non-conductive portion,
a second conductive portion extending from the second non-conductive portion to a location on the second periphery, and
a first slot between the second conductive portion and a first support member disposed within the first housing,
wherein the second housing includes:
a third conductive portion extending from the fourth non-conductive portion to a location on the fifth periphery, and
a second slot between the third conductive portion and a second support member disposed within the second housing, and
wherein, in the folded state, the communication circuitry is configured to communicate with an external electronic device, using an electromagnetic field formed at the first slot and the second slot, based on feeding the first conductive portion.

2. The electronic device of claim 1,
wherein the first housing includes a fourth conductive portion extending from the first non-conductive portion toward the folding axis along the first periphery, and
wherein the second housing includes:
a fifth conductive portion extending from the third non-conductive portion to the fourth non-conductive portion, and
a sixth conductive portion extending from the third non-conductive portion toward the folding axis along the fourth periphery.

3. The electronic device of claim 2,
wherein, in the folded state, when the electronic device is viewed from above in a direction from the first housing toward the second housing, the first non-conductive portion is disposed to overlap the third conductive portion, and
wherein, in the folded state, when the electronic device is viewed from above in the direction from the first housing toward the second housing, the second non-conductive portion is disposed to overlap the fifth conductive portion.

4. The electronic device of claim 2,
wherein, in the folded state, when the electronic device is viewed from above in a direction from the second housing toward the first housing, the third non-conductive portion is disposed to overlap the second conductive portion, and
wherein, in the folded state, when the electronic device is viewed from above in the direction from the second housing toward the first housing, the fourth non-conductive portion is disposed to overlap the first conductive portion.

5. The electronic device of claim 2,
wherein the first housing includes a third slot between the fourth conductive portion and the first support member, and
wherein the second housing includes a fourth slot between the sixth conductive portion and the second support member.

6. The electronic device of claim 5, wherein the first slot, the second slot, the third slot, and the fourth slot include a non-conductive material.

7. The electronic device of claim 2, wherein the communication circuitry is configured to transmit a signal to the external electronic device based on feeding at least one of the first conductive portion, the second conductive portion, the third conductive portion, and the fifth conductive portion, in an unfolded state of the electronic device different from the folded state.

8. The electronic device of claim 2,
wherein the first housing includes a fifth non-conductive portion, disposed on the second periphery, separating the second conductive portion into a seventh conductive portion and an eighth conductive portion, and
wherein the second housing includes a sixth non-conductive portion, disposed on the fifth periphery, separating the third conductive portion into a ninth conductive portion and a tenth conductive portion.

9. The electronic device of claim 8, further comprising:
a first switch capable of electrically connecting the seventh conductive portion and the eighth conductive portion;
a second switch capable of electrically connecting the ninth conductive portion and the tenth conductive portion;
memory, comprising one or more storage media, storing instructions; and
at least one processor, comprising processing circuitry, communicatively coupled to first switch, the second switch, and the memory,
wherein the instructions, when executed by the at least one processor individually or collectively, cause the electronic device to:
control, in the folded state, the first switch or the second switch to adjust an electrical length of an antenna including the first conductive portion, the second conductive portion, and the third conductive portion.

10. The electronic device of claim 2, further comprising:
fourth impedance matching circuitry electrically connected to the fifth conductive portion;
memory, comprising one or more storage media, storing instructions; and
at least one processor, comprising processing circuitry, communicatively coupled to the memory,
wherein the instructions, when executed by the at least one processor individually or collectively, cause the electronic device to:
adjust, in the folded state, a resonant frequency of an antenna, which includes the first conductive portion, the second conductive portion, and the third conductive portion, through the fourth impedance matching circuitry.

11. The electronic device of claim 2, further comprising:
a sensor for identifying the folded state or an unfolded state of the electronic device different from the folded state;
memory, comprising one or more storage media, storing instructions; and
at least one processor, comprising processing circuitry, communicatively coupled to the sensor and the memory,
wherein the instructions, when executed by the at least one processor individually or collectively, cause the electronic device to:
based on identifying the unfolded state through data obtained from the sensor, control, the communication circuitry to feed the first conductive portion, and
based on identifying the folded state through the sensor, control the communication circuitry to feed the first conductive portion or the fifth conductive portion.

12. The electronic device of claim 1, further comprising:
first impedance matching circuitry electrically connected to the first conductive portion;
memory, comprising one or more storage media, storing instructions; and
at least one processor, comprising processing circuitry, communicatively coupled to the memory,
wherein the instructions, when executed by the at least one processor individually or collectively, cause the electronic device to:
adjust, in the folded state, a resonant frequency of an antenna, which includes the first conductive portion, the second conductive portion, and the third conductive portion, into a designated frequency band through the first impedance matching circuitry.

13. The electronic device of claim 1, further comprising:
second impedance matching circuitry electrically connected to the second conductive portion;
third impedance matching circuitry electrically connected to the third conductive portion;
memory, comprising one or more storage media, storing instructions; and
at least one processor, comprising processing circuitry, communicatively coupled to the memory,
wherein the instructions, when executed by the at least one processor individually or collectively, cause the electronic device to:
adjust, in the folded state, a resonant frequency of an antenna, which includes the first conductive portion, the second conductive portion, and the third conductive portion, through the second impedance matching circuitry and the third impedance matching circuitry.

14. The electronic device of claim 1, wherein the first conductive portion, the second conductive portion, and the third conductive portion operate as at least a portion of an antenna when the communication circuitry feeds the first conductive portion in the folded state.

15. The electronic device of claim 1, further comprising:
a hinge structure configured to rotatably connect the first housing and the second housing with respect to the folding axis so as to enable the electronic device to be switched to the folded state or an unfolded state of the electronic device different from the folded state.

16. An electronic device comprising:
a first housing including:
a first periphery, extending from a folding axis, including a first non-conductive portion,
a second periphery, extending from the folding axis, and opposite the first periphery, and
a third periphery between the first periphery and the second periphery, spaced apart from the folding axis, and including a second non-conductive portion;
a second housing including:
a fourth periphery, extending from the folding axis, including a third non-conductive portion,
a fifth periphery, extending from the folding axis, and opposite the fourth periphery, and
a sixth periphery between the fourth periphery and the fifth periphery, spaced apart from the folding axis, including a fourth non-conductive portion; and
communication circuitry disposed in at least one of the first housing or the second housing,
wherein the first housing and the second housing are rotatably connected with respect to the folding axis,
wherein the fourth non-conductive portion is disposed to overlap a first conductive portion extending from the first non-conductive portion to the second non-conductive portion, when the electronic device is viewed from above in a direction from the second housing toward the first housing in a folded state of the electronic device, and
wherein the third non-conductive portion is disposed to overlap a second conductive portion extending from the second non-conductive portion to a location on the second periphery, when the electronic device is viewed from above in the direction from the second housing toward the first housing in the folded state.

17. The electronic device of claim 16,
wherein the first housing includes a first slot between the second conductive portion and a first support member disposed within the first housing,
wherein the second housing includes a second slot between a third conductive portion, extending from the fourth non-conductive portion to a location on the fifth periphery, and a second support member disposed within the second housing, and
wherein, in the folded state, the communication circuitry is configured to communicate with an external electronic device, using an electromagnetic field formed at the first slot and the second slot, based on feeding the first conductive portion.

18. The electronic device of claim 17,
wherein the first housing includes a fourth conductive portion extending from the first non-conductive portion toward the folding axis along the first periphery, and
wherein the second housing includes:
a fifth conductive portion extending from the third non-conductive portion to the fourth non-conductive portion, and a sixth conductive portion extending from the third non-conductive portion toward the folding axis along the fourth periphery.

19. The electronic device of claim 18, further comprising:

first impedance matching circuitry electrically connected to the first conductive portion;

memory, comprising one or more storage media, storing instructions; and at least one processor, comprising processing circuitry, communicatively coupled to the memory, wherein the instructions, when executed by the at least one processor individually or collectively, cause the electronic device to:

adjust, in the folded state, a resonant frequency of an antenna, which includes the first conductive portion, the second conductive portion, and the third conductive portion, into a designated frequency band through the first impedance matching circuitry.

20. The electronic device of claim 17, wherein the first conductive portion, the second conductive portion, and the third conductive portion are configured to function as at least a portion of an antenna, when the communication circuitry feeds the first conductive portion, in the folded state of the electronic device.

* * * * *